US012418680B1

(12) United States Patent
Galvin

(10) Patent No.: US 12,418,680 B1
(45) Date of Patent: Sep. 16, 2025

(54) MULTIMODAL LATENT HYPERSPACE NAVIGATION INCORPORATING SPECTRAL, SPATIAL, TEMPORAL, AND SCALE DIMENSIONS

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/245,366

(22) Filed: Jun. 22, 2025

(51) Int. Cl.
*H04N 19/597* (2014.01)
(52) U.S. Cl.
CPC .................. *H04N 19/597* (2014.11)
(58) Field of Classification Search
None
See application file for complete search history.

(56) References Cited

U.S. PATENT DOCUMENTS

2022/0139037 A1\* 5/2022 Li .................. G06V 10/26
345/419

\* cited by examiner

*Primary Examiner* — Christopher Braniff
(74) *Attorney, Agent, or Firm* — Galvin Patent Law LLC; Brian R Galvin

(57) ABSTRACT

A system and method for multimodal latent hyperspace navigation that enables efficient compression and interactive exploration of spatiotemporal and spectral media content. The system encodes video data into a structured seven-dimensional hyperspace spanning spatial coordinates, temporal progression, viewing orientation, scale, and spectral wavelength using variational autoencoders that generate locally Lorentzian latent patches. Navigation through the hyperspace is achieved via learned geodesic transition functions guided by a latent-space metric tensor, while generative fill-in modules synthesize content for sparsely populated regions. The architecture supports real-time deployment on resource-constrained devices such as set-top boxes through efficient latent decoding and optional generative refinement. Applications include immersive film exploration with continuous zoom and viewpoint control, surveillance systems with anomaly detection capabilities, and hyperspectral environmental monitoring with real-time spectral analysis across multiple wavelength bands.

8 Claims, 16 Drawing Sheets

MULTIMODAL LATENT HYPERSPACE NAVIGATION INCORPORATING SPECTRAL, SPATIAL, TEMPORAL, AND SCALE DIMENSIONS

CROSS-REFERENCE TO RELATED APPLICATIONS

Priority is claimed in the application data sheet to the following patents or patent applications, each of which is expressly incorporated herein by reference in its entirety:
None

BACKGROUND OF THE INVENTION

Field of the Art

The present invention relates to systems and methods for encoding, compressing, and navigating multimedia content through a structured latent hyperspace that enables continuous traversal across spatial, temporal, spectral, angular, and scale dimensions.

Discussion of the State of the Art

Traditional video compression systems rely on discrete frame-based encoding using established codecs such as H.264, H.265/HEVC, and AV1, which achieve compression through temporal prediction, spatial transformation, and quantization techniques. While these methods provide reasonable compression ratios, they are fundamentally limited by their frame-centric approach and inability to exploit higher-dimensional relationships across multiple modalities simultaneously.

Recent advances in neural compression have introduced variational autoencoders (VAEs) and learned codecs that can achieve superior compression ratios compared to traditional methods. However, these approaches typically operate on individual frames or short temporal sequences and do not provide unified frameworks for navigating content across multiple dimensions such as viewpoint, scale, time, and spectral properties.

Neural radiance fields (NeRFs) and related view synthesis techniques have demonstrated the ability to reconstruct novel viewpoints from sparse camera inputs, enabling limited 3D scene exploration. However, NeRF-based systems suffer from significant computational overhead during inference, lack temporal coherence mechanisms, and do not integrate spectral or hyperspectral data into their representations. Additionally, these systems cannot efficiently encode or transmit their learned representations for real-time streaming applications.

Existing latent diffusion models and generative adversarial networks (GANs) have shown promise for content generation and inpainting, but they operate independently of structured spatial-temporal representations and cannot provide coherent navigation through high-dimensional media spaces. Current systems also lack the ability to perform real-time generative fill-in for missing or sparsely sampled regions during content traversal.

Set-top boxes and edge devices for media consumption are constrained by limited computational resources, memory bandwidth, and power consumption requirements. Existing compression and streaming protocols do not provide mechanisms for interactive exploration of media content beyond traditional playback controls, limiting user engagement and immersive experiences.

In specialized applications such as surveillance systems, hyperspectral imaging, and scientific visualization, current approaches require separate processing pipelines for spatial analysis, temporal event detection, and spectral interpretation. This fragmentation leads to inefficient data storage, limited cross-modal analysis capabilities, and inability to provide unified interfaces for multi-dimensional data exploration.

What is needed is a unified system and method for multimodal latent hyperspace navigation that enables efficient compression, transmission, and real-time exploration of spatiotemporal and spectral media content. By integrating variational autoencoders, geodesic transition functions, and generative fill-in modules into a structured hyperspace architecture, media content can be efficiently encoded across multiple dimensions while enabling continuous navigation through space, time, viewpoint, scale, and spectral properties with minimal computational overhead on client devices.

SUMMARY OF THE INVENTION

Accordingly, the inventor has conceived and reduced to practice, a system and method for multimodal latent hyperspace navigation incorporating spectral, spatial, temporal, and scale dimensions. The system and method provides encoding, storing, and navigating multidimensional media content through a unified latent hyperspace architecture. At its core, the system transforms traditional video and spectral imagery into compact Lorentzian latent patches using specialized variational autoencoders that process spatiotemporal-spectral kernels. These latent representations are organized within a 7-dimensional hyperspace spanning spatial coordinates (x, y, z), viewing angles (theta, phi), time (t), zoom level (zeta), and spectral wavelength (lambda). By treating all these dimensions as equally navigable axes, the system enables unprecedented freedom in exploring media content-users can seamlessly zoom from macro to microscopic scales, rotate around subjects, move through time, and shift across electromagnetic spectra, all within a geometrically consistent framework.

The architecture employs machine learning techniques to enable smooth navigation even through sparsely sampled regions. A learned metric tensor models the geometric structure of the latent space, defining geodesic paths that minimize perceptual distortion during traversal. When users navigate to regions lacking encoded data, a conditional diffusion model synthesizes plausible latent patches based on neighboring context, ensuring continuous exploration beyond recorded boundaries. The system achieves remarkable compression ratios exceeding 100:1 while maintaining high-quality reconstruction, made possible by exploiting redundancies across all dimensions simultaneously and employing learned codebooks optimized for latent representations.

Practical deployment is achieved through a distributed architecture where cloud-based encoding and storage systems stream compressed latent patches to resource-constrained edge devices like set-top boxes or mobile devices. The edge devices employ efficient neural decoders and intelligent caching strategies to provide responsive navigation despite limited computational resources. Applications span from immersive cinematic experiences where viewers can explore scenes from multiple perspectives, to scientific visualization enabling researchers to navigate through hyperspectral datacubes, to AI-assisted surveillance systems that efficiently store and analyze extended temporal sequences. By fundamentally reimagining how visual media is represented and accessed, the invention opens new possibilities for content creation, distribution, and interaction in an increasingly bandwidth-constrained yet experience-demanding digital ecosystem.

According to a preferred embodiment, a computer system comprising: a hardware memory, wherein the computer system is configured to execute software instructions stored on nontransitory machine-readable storage media that: initialize a multi-dimensional hyperspace coordinate system; encode a plurality of media data into compact latent representations by processing a plurality of multi-dimensional kernels through a variational autoencoder constrained to produce Lorentzian latent patches; organize the latent patches in a navigable hyperspace memory indexed by coordinate tuples that specify position across all dimensional axes; enable smooth traversal through the hyperspace by learning a metric tensor that defines geodesic paths between latent patches; maintain navigational continuity in sparse regions by synthesizing plausible latent patches through conditional diffusion based on neighboring context; and reconstruct visual content at arbitrary hyperspace positions by decoding and blending relevant latent patches according to user navigation commands, is disclosed.

According to another preferred embodiment, a method for multimodal latent hyperspace navigation incorporating spectral, spatial, temporal, and scale dimensions, comprising the steps of: initializing a multi-dimensional hyperspace coordinate system; encoding a plurality of media data into compact latent representations by processing a plurality of multi-dimensional kernels through a variational autoencoder constrained to produce Lorentzian latent patches; organizing the latent patches in a navigable hyperspace memory indexed by coordinate tuples that specify position across all dimensional axes; enabling smooth traversal through the hyperspace by learning a metric tensor that defines geodesic paths between latent patches; maintaining navigational continuity in sparse regions by synthesizing plausible latent patches through conditional diffusion based on neighboring context; and reconstructing visual content at arbitrary hyperspace positions by decoding and blending relevant latent patches according to user navigation commands, is disclosed.

According to an aspect of an embodiment, the hyperspace coordinate system spans spatial, temporal, orientation, scale, and spectral axes.

According to an aspect of an embodiment, the variational autoencoder processes kernel-sized tensor inputs that capture spatial regions, temporal frames, and spectral bands, and outputs 2D latent arrays that preserve spatial structure.

BRIEF DESCRIPTION OF THE DRAWING FIGURES

DETAILED DESCRIPTION OF THE INVENTION

Figure 1:
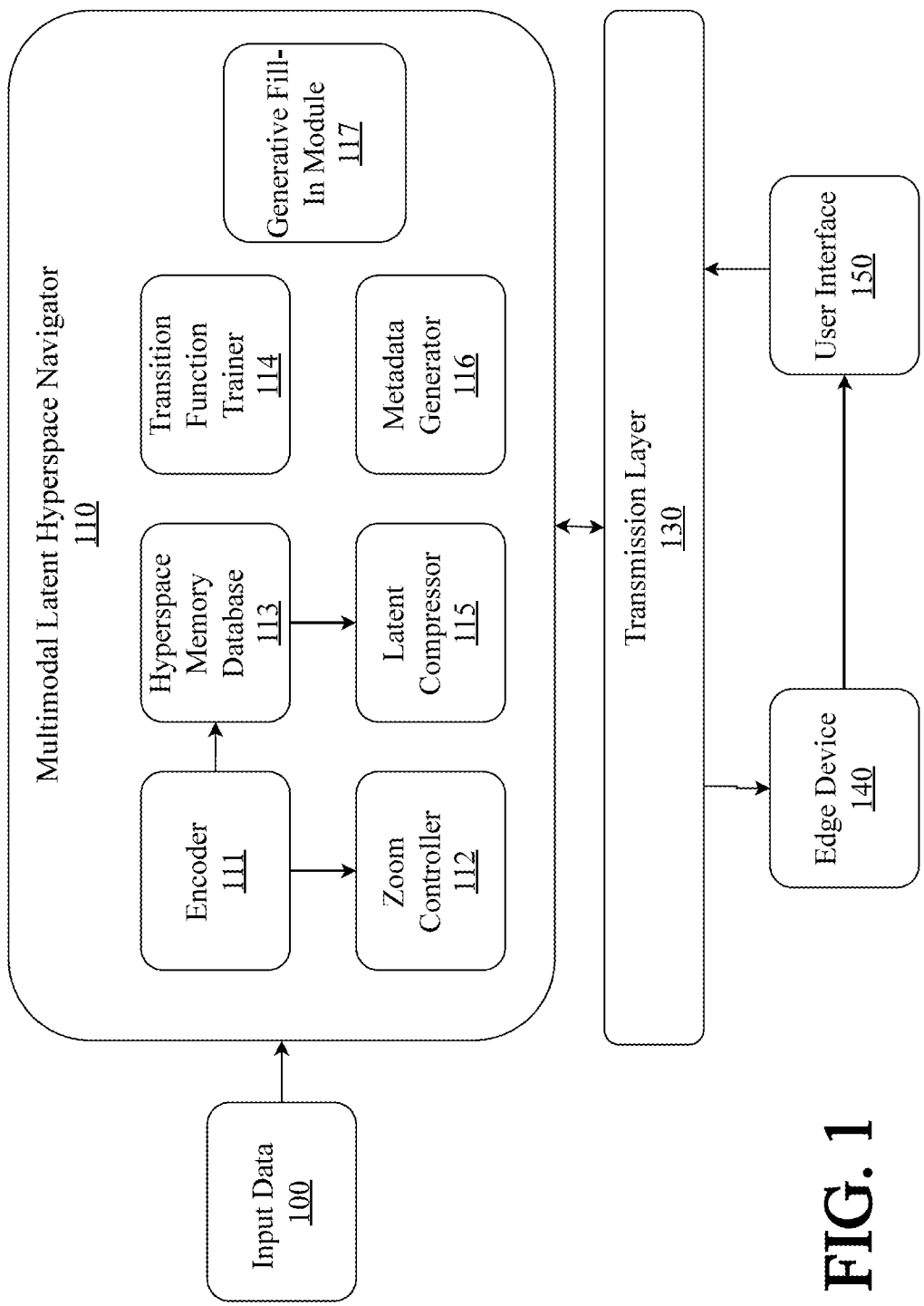
FIG. 1 is a block diagram illustrating an exemplary system architecture for a multimodal latent hyperspace navigator.

The inventor has conceived, and reduced to practice, a system and method for multimodal latent hyperspace navigation incorporating spectral, spatial, temporal, and scale dimensions. The invention provides a system and method for encoding, storing, and navigating multidimensional media content through a structured latent hyperspace architecture that fundamentally transforms how visual information is represented and accessed. Traditional video systems encode content as sequences of frames at fixed resolutions, severely limiting user interaction and wasting bandwidth on redundant information. In contrast, this system employs a sophisticated variational autoencoder architecture that processes spatiotemporal-spectral kernels to generate compact Lorentzian latent patches-multidimensional representations that capture the essential structure of media content while achieving compression ratios exceeding 100:1. These patches are organized within a navigable 7-dimensional hyperspace with coordinates spanning three spatial dimensions (x, y, z), two orientation angles (theta, phi), temporal position (t), continuous zoom scale (zeta), and spectral wavelength (lambda). This unified coordinate system treats space, time, scale, and spectrum as equally navigable dimensions, enabling users to seamlessly explore media in ways impossible with conventional formats-zooming continuously from satellite views to microscopic details, rotating around subjects to view from any angle, moving freely through time, or shifting through electromagnetic spectra to reveal hidden information.

The system's intelligence lies in its ability to understand and model the geometric relationships between different regions of the hyperspace through a learned latent-space metric tensor. This metric tensor, trained on the relationships between latent patches with known coordinate displacements, defines geodesic paths through the hyperspace that minimize perceptual distortion during navigation. When users traverse regions where no encoded data exists—such as extreme zoom levels, intermediate time points, or novel viewing angles—a conditional diffusion model generates synthetic latent patches that maintain visual and structural consistency with surrounding content. The generative process considers local context embeddings extracted from neighboring patches, hyperspace displacement vectors, and learned patterns of visual continuity to synthesize plausible content that enables exploration beyond the boundaries of recorded data. A comprehensive metadata system tracks the provenance, quality, and relationships of all patches, distinguishing between original encoded content and synthetically generated regions while maintaining transparency about data authenticity.

The practical implementation employs a distributed architecture optimized for real-world deployment constraints. Cloud-based encoding systems process incoming media streams through specialized pathways—spatial convolutions capture structural information, temporal processing extracts motion patterns, and spectral compression preserves material signatures—before the VAE bottleneck creates the final Lorentzian latent representation. An intelligent compression layer further reduces bandwidth requirements through learned codebooks containing frequently occurring latent patterns and entropy encoding adapted to latent statistics. The hyperspace memory database indexes billions of patches using specialized high-dimensional data structures that support complex queries combining spatial, temporal, and spectral criteria. During streaming, sophisticated prioritization algorithms allocate bandwidth based on viewing likelihood, perceptual importance, and navigation predictions, ensuring smooth experiences even on limited connections.

Edge devices, despite computational constraints, provide responsive navigation through efficient neural decoders optimized for hardware acceleration and intelligent caching strategies that predict and prefetch likely navigation targets. The system supports diverse applications across multiple domains: cinematic content transforms from linear narratives into explorable experiences where viewers can zoom into background details or view scenes from alternative perspectives; scientific visualization enables researchers to navigate seamlessly through hyperspectral datacubes, discovering patterns across spatial, temporal, and wavelength dimensions; surveillance systems achieve thousand-fold compression by encoding only anomaly-relevant spatiotemporal regions while maintaining the ability to reconstruct any event on demand; and emerging AR/VR platforms gain the ability to render arbitrary viewpoints and scales without storing massive pre-rendered asset libraries. By reconceptualizing media as navigable information spaces rather than fixed recordings, the invention establishes a new paradigm for content creation, distribution, and interaction that scales from mobile devices to massive scientific datasets while providing unprecedented freedom for exploration and analysis.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a multimodal latent hyperspace navigator. FIG. 1 illustrates the overall system architecture for the multimodal latent hyperspace navigator 110, which serves as the central processing system for encoding, storing, and navigating spatiotemporal and spectral media content. The system receives input data 100 comprising video frames, spectral imagery, or other multidimensional media content that may include spatial coordinates (x, y, z), temporal sequences, multiple viewing angles, various zoom levels, and spectral wavelength information spanning visible and non-visible ranges.

An encoder 111 forms the primary ingestion point for the system, processing the input data 100 through a specialized variational autoencoder (VAE) architecture. Encoder 111 operates on kernel-sized tensor inputs that capture not just individual frames but spatiotemporal-spectral neighborhoods around reference coordinates in the media space. For example, when encoding a particular scene moment, encoder 111 might process a 64×64 pixel spatial crop along with 5 temporal frames and 16 spectral bands, creating a rich multidimensional representation. Encoder 111 transforms this high-dimensional input into compact Lorentzian latent patches—2D arrays that preserve spatial structure while encoding the manifold properties necessary for smooth hyperspace navigation. These latent patches achieve high compression ratios by exploiting redundancies across all captured dimensions.

A zoom controller 112 manages user interactions and navigation requests within the hyperspace, translating commands like zoom, pan, rotate, or spectral shift into precise coordinate transformations. When a user requests to zoom into a particular region or change viewing perspective, zoom controller 112 calculates the required traversal path through the 7-dimensional hyperspace (x, y, z, theta, phi, t, zeta, lambda) and coordinates with other system components to retrieve or generate the necessary latent patches. Zoom controller 112 maintains awareness of the current viewing context and can predict likely navigation paths, enabling preemptive patch retrieval for smoother user experiences.

A hyperspace memory database 113 serves as the structured storage system for all encoded latent patches, organizing them according to their hyperspace coordinates. Each latent patch is indexed by a complete coordinate tuple that specifies its exact location in the multidimensional space. Database 113 implements efficient query mechanisms to retrieve patches based on spatial proximity, temporal relationships, or spectral characteristics. For instance, when rendering a scene at a new zoom level, database 113 can quickly identify all relevant patches within a geodesic distance threshold, enabling rapid reconstruction of the desired view.

A transition function trainer 114 develops and maintains the neural models responsible for navigating between latent patches in the hyperspace. This component learns a latent-space metric tensor that defines geodesic paths—the paths of minimal distortion—between different regions of the hyperspace. By training on pairs of latent patches with known displacements, transition function trainer 114 creates models that can smoothly interpolate or extrapolate latent representations when moving through space, time, scale, or wavelength. This enables the system to generate plausible intermediate views even when explicit latent patches don't exist for every possible coordinate.

A latent compressor 115 optimizes the latent representations for efficient transmission and storage, applying techniques such as learned codebooks, entropy encoding, and adaptive quantization. Given that latent patches may need to be streamed to resource-constrained devices like set-top boxes, latent compressor 115 can dynamically adjust compression levels based on available bandwidth and quality requirements. For example, patches representing high-motion scenes might receive priority bit allocation, while static background regions undergo more aggressive compression.

A metadata generator 116 creates comprehensive descriptive information for each latent patch and navigation session, tracking hyperspace coordinates, viewing parameters, traversal histories, and quality metrics. This metadata is helpful for synchronizing the reconstruction process, enabling features like temporal alignment across multiple patches and maintaining consistency during complex navigation sequences. Metadata generator 116 packages this information in a format optimized for co-transmission with compressed latent data.

A transmission layer 130 handles all communication between the cloud-based processing components and remote devices, implementing protocols for streaming latent patches, metadata, and control signals. Transmission layer 130 can adaptively manage bandwidth allocation, prioritizing the delivery of patches based on viewing likelihood and user navigation patterns. It supports both push-based streaming for predicted content and pull-based requests for specific patches during unexpected navigation.

An edge device 140 represents the client-side deployment platform, such as a set-top box, mobile device, or AR/VR headset, where latent patches are decoded and rendered for user viewing. Despite limited computational resources, edge device 140 can perform real-time reconstruction of high-quality video from compressed latent representations, leveraging efficient decoder networks and optional generative refinement for enhanced detail. Edge device 140 maintains a local cache of frequently accessed patches and can operate in degraded network conditions by utilizing previously received or synthetically generated content.

A user interface 150 provides the interaction mechanisms for navigating the latent hyperspace, supporting various input modalities such as gesture control, voice commands, or traditional interfaces. User interface 150 translates user intentions into specific navigation commands that the zoom controller 112 can process, enabling intuitive exploration of media content across multiple dimensions. For instance, a pinch gesture might control spatial zoom (zeta), while a swipe could advance through time (t), and a specialized control could shift through spectral bands (lambda) for scientific visualization applications.

This integrated system architecture enables flexibility in media consumption, allowing users to seamlessly navigate through space, time, perspective, scale, and spectrum within a unified framework. The combination of efficient encoding, structured storage, intelligent navigation, and adaptive reconstruction creates a platform suitable for applications ranging from immersive entertainment to scientific analysis and surveillance systems.

Figure 2:
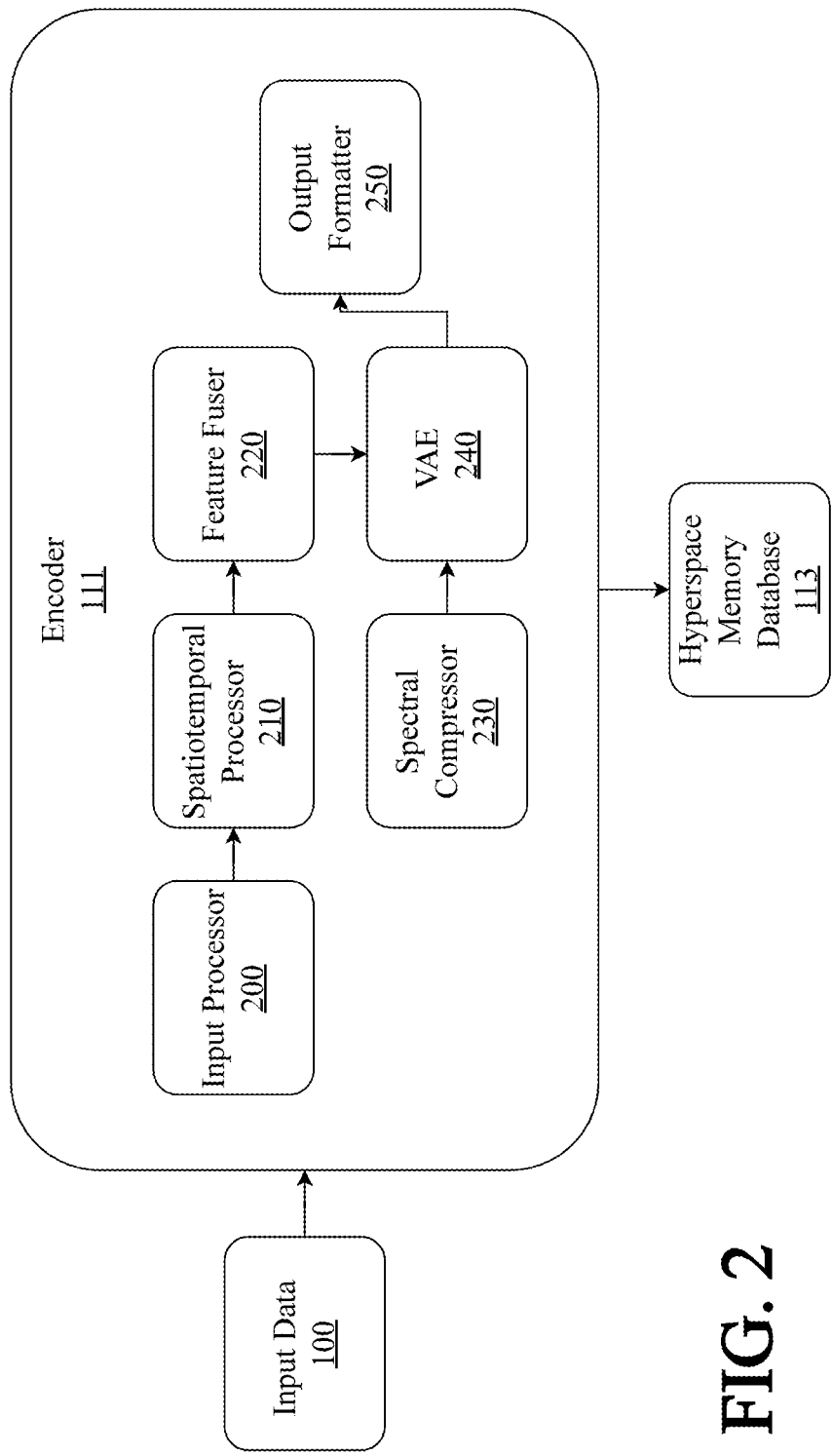
FIG. 2 is a block diagram illustrating an exemplary architecture for an encoder within the multimodal latent hyperspace navigator.

FIG. 2 is a block diagram illustrating an exemplary architecture for an encoder within the multimodal latent hyperspace navigator. The encoder 111 transforms high-dimensional spatiotemporal and spectral input data 100 into compact Lorentzian latent patches that serve as the fundamental representation units within the hyperspace memory database 113.

An input processor 200 receives input data 100 and performs initial preprocessing to prepare the multidimensional content for encoding. Input processor 200 extracts kernel-sized tensor segments from the raw media stream, where each kernel captures a local neighborhood in the hyperspace. For instance, when processing hyperspectral satellite imagery, input processor 200 might extract a 32×32 spatial region across 64 spectral bands and 5 temporal frames, creating a 32×32×64×5 tensor. Input processor 200 also handles data normalization, format conversion, and coordinate system alignment to ensure consistent processing regardless of the input source. Additionally, input processor 200 can apply adaptive kernel sizing based on content characteristics—using larger kernels for slowly changing environmental monitoring data or smaller kernels for high-motion action sequences.

A spatiotemporal processor 210 analyzes the spatial and temporal dimensions of the input kernel to extract motion patterns, structural features, and continuity information. Spatiotemporal processor 210 employs specialized convolutional layers that jointly process spatial and temporal information, using 3D convolutions or factorized space-time operations. For example, spatiotemporal processor 210 might detect that a particular region contains a moving object with consistent trajectory across frames, encoding this motion pattern efficiently rather than redundantly representing the object in each frame. Spatiotemporal processor 210 generates feature maps that capture both static scene structure and dynamic temporal evolution, producing intermediate representations that preserve the causal relationships necessary for the Lorentzian manifold structure.

A feature fuser 220 combines the spatiotemporal features with additional dimensional information, including but not limited to viewing angle parameters, scale indicators, and preliminary spectral characteristics. Feature fuser 220 implements attention mechanisms or gated fusion operations to weight the importance of different feature types based on the content and encoding context. For surveillance applications, feature fuser 220 might prioritize temporal change detection features, while for scientific visualization, it might emphasize spectral discrimination capabilities. Feature fuser 220 produces a unified feature representation that maintains the relationships between all input dimensions while reducing redundancy.

A spectral compressor 230 specifically handles the spectral dimension of the input data, reducing the high-dimensional wavelength information to a more compact representation while preserving material-specific signatures and spectral gradients. Spectral compressor 230 may employ principal component analysis, learned spectral bases, or specialized neural architectures designed for hyperspectral data compression. For instance, when encoding agricultural monitoring data, spectral compressor 230 might identify and preserve specific wavelength combinations that indicate crop health or soil moisture while discarding redundant spectral information. Spectral compressor 230 can adapt its compression strategy based on the application domain, using different spectral bases for medical imaging versus environmental monitoring.

A variational autoencoder (VAE) 240 forms the core of the encoding process, transforming the fused features into the final Lorentzian latent patch representation. VAE 240 consists of an encoder network that maps the input features to a latent distribution and a decoder network used during training to ensure reconstruction capability. The latent space is specifically constrained to exhibit Lorentzian (pseudo-Euclidean) geometry, where distances may represent causal relationships rather than simple Euclidean feature differences. VAE 240 outputs a 2D latent array—perhaps 16×16 with 32 channels—that encodes the essential information from the input kernel. The variational formulation includes KL divergence regularization to ensure smooth latent space properties, with additional constraints to maintain the Lorentzian structure necessary for geodesic navigation. During training, VAE 240 learns to balance reconstruction accuracy with latent space regularity, creating representations that support both high-quality decoding and smooth interpolation.

An output formatter 250 prepares the latent patch for storage in the hyperspace memory database 113, adding necessary indexing information and packaging the data for efficient retrieval. Output formatter 250 attaches the hyperspace coordinate tuple (x, y, z, theta, phi, t, zeta, lambda) that specifies where this latent patch belongs in the multidimensional space. Output formatter 250 also computes auxiliary information such as confidence metrics, encoding quality indicators, and relationship pointers to neighboring patches in the hyperspace. For example, output formatter 250 might flag that a particular patch represents a transition region between two scenes, requiring special handling during traversal. Output formatter 250 can also generate multiple resolution versions of the same latent patch to support efficient multi-scale navigation.

Encoder 111 architecture enables efficient and flexible encoding of diverse media types within a unified framework. By processing input data through specialized pathways for different dimensions and fusing them through the VAE bottleneck, encoder 111 creates latent representations that preserve the essential characteristics of the content while achieving substantial compression. The Lorentzian structure of the latent patches ensures that navigation through the hyperspace follows perceptually meaningful paths, enabling smooth transitions across space, time, scale, and spectrum. This encoding approach supports real-time processing for live content streams as well as batch processing for large media archives, adapting its operation based on available computational resources and quality requirements.

Figure 3:
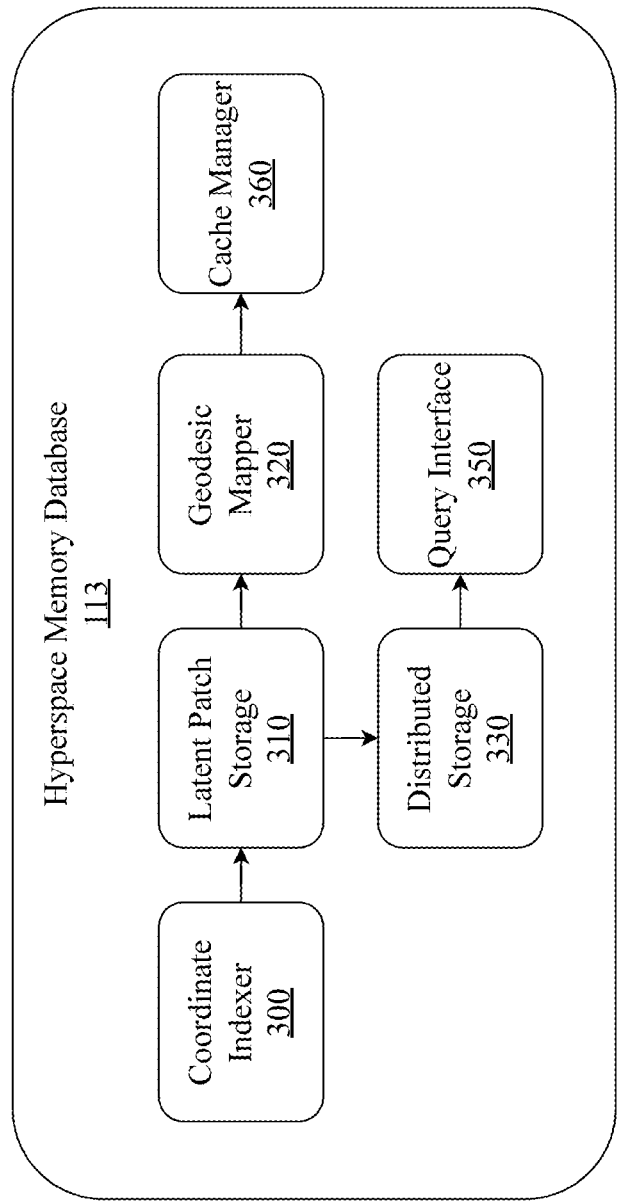
FIG. 3 is a block diagram illustrating an exemplary architecture for a hyperspace memory database of the multimodal latent hyperspace navigator.

FIG. 3 is a block diagram illustrating an exemplary architecture for a hyperspace memory database of the multimodal latent hyperspace navigator. A coordinate indexer 300 manages the multidimensional indexing system that maps each latent patch to its precise location within the hyperspace. Coordinate indexer 300 implements specialized data structures optimized for high-dimensional nearest-neighbor queries, such as k-d trees, R-trees, or learned indexing mechanisms. When a new latent patch arrives from encoder 111, coordinate indexer 300 extracts the coordinate tuple (x, y, z, theta, phi, t, zeta, lambda) and creates multiple index entries to support different query patterns. For example, coordinate indexer 300 might create separate indices for spatial proximity searches, temporal sequence retrieval, and spectral band queries. Coordinate indexer 300 also maintains boundary information and coverage maps that indicate which regions of the hyperspace contain actual data versus sparse areas requiring generative fill-in.

A latent patch storage 310 serves as the primary repository for the encoded latent arrays, implementing efficient storage mechanisms that balance access speed with storage density. Latent patch storage 310 organizes patches in a hierarchical structure that reflects the natural clustering patterns in the hyperspace—for instance, grouping patches from the same temporal sequence or spatial region for improved cache locality. Each stored patch includes not only the latent array data but also associated metadata such as encoding timestamps, quality metrics, and usage statistics. Latent patch storage 310 can employ compression techniques specific to latent representations, such as vector quantization or sparse coding, to further reduce storage requirements. For large-scale deployments, latent patch storage 310 supports tiered storage architectures where frequently accessed patches reside in fast memory while archival content moves to slower, denser storage media.

A geodesic mapper 320 computes and maintains the metric relationships between latent patches in the hyperspace, enabling efficient navigation path planning. Geodesic mapper 320 works in conjunction with transition function trainer 114 to understand the learned metric tensor and precompute optimal traversal paths between commonly accessed regions. For instance, when storing patches from a cinematic sequence, geodesic mapper 320 might calculate and cache the geodesic paths for standard navigation operations like zoom-in, pan, or temporal advancement. Geodesic mapper 320 also identifies "hub" patches that serve as efficient waypoints for longer traversals and maintains a navigation graph structure that accelerates path finding. During retrieval operations, geodesic mapper 320 can quickly determine whether a direct path exists between two patches or if intermediate synthesis will be required.

A distributed storage 330 module enables the hyperspace memory database 113 to scale across multiple storage nodes while maintaining coherent access patterns. Distributed storage 330 implements sharding strategies that partition the hyperspace into regions, distributing patches across nodes based on access patterns and geographic considerations. For example, distributed storage 330 might colocate patches that are frequently accessed together or assign different spectral bands to specialized storage nodes optimized for scientific data. Distributed storage 330 handles replication for fault tolerance, ensuring that critical patches remain available even during node failures. The module also implements consistency protocols that maintain the integrity of geodesic relationships when patches are updated or when new regions of the hyperspace are populated.

A query interface 350 provides the primary access mechanism for other system components to retrieve latent patches from the database. Query interface 350 supports multiple query types including point queries (retrieve specific patch at coordinates), range queries (all patches within a spatial region), k-nearest neighbor queries (closest patches to a target location), and path queries (patches along a geodesic trajectory). Query interface 350 translates high-level navigation requests from zoom controller 112 into efficient database operations, potentially decomposing complex queries into multiple simpler operations. For example, a request to view a scene from a novel viewpoint might trigger a k-nearest neighbor query to find relevant patches, followed by path queries to plan the interpolation trajectory. Query interface 350 also implements query optimization techniques, such as predictive prefetching based on navigation patterns and caching of frequently accessed query results.

A cache manager 360 optimizes access performance by maintaining an in-memory cache of frequently accessed patches and preloading likely-to-be-requested content. Cache manager 360 implements sophisticated eviction policies that consider not just access frequency but also the computational cost of regenerating patches and their importance for maintaining navigation continuity. For instance, cache manager 360 might prioritize keeping patches at key zoom levels or temporal keyframes that serve as anchors for interpolation. Cache manager 360 also coordinates with edge device 140 caches to maintain consistency and avoid redundant storage. During high-load scenarios, cache manager 360 can dynamically adjust its memory footprint and implement quality-of-service policies that ensure smooth navigation for active users while managing background tasks like speculative preloading.

The hyperspace memory database 113 architecture enables efficient storage and retrieval of massive amounts of latent patch data while supporting the complex query patterns required for multidimensional navigation. By combining specialized indexing structures, distributed storage capabilities, and intelligent caching mechanisms, hyperspace memory database 113 can scale to handle applications ranging from personal media collections to large-scale surveillance networks or scientific data repositories. The tight integration between storage organization and the geometric structure of the hyperspace ensures that navigation operations translate directly to efficient database operations, enabling real-time exploration of vast media spaces.

Figure 4:
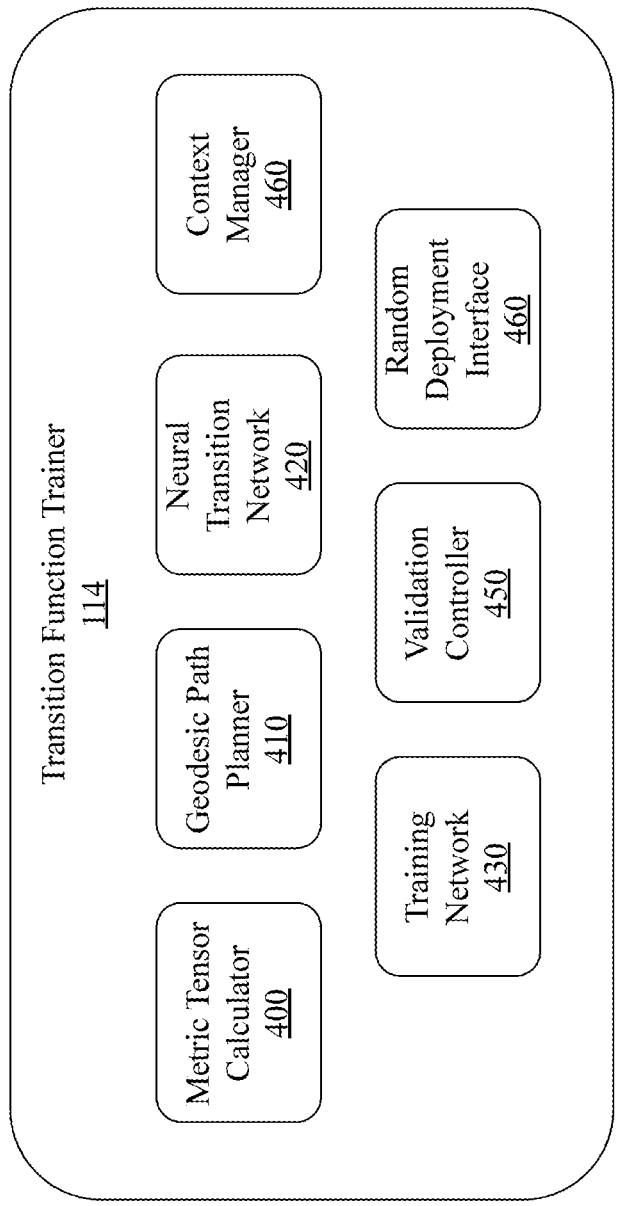
FIG. 4 is a block diagram illustrating an exemplary architecture for a transition function trainer component of the multimodal latent hyperspace navigator.

FIG. 4 is a block diagram illustrating an exemplary architecture for a transition function trainer component of the multimodal latent hyperspace navigator. A metric tensor calculator 400 learns and maintains the latent-space metric tensor that defines the geometric properties of the hyperspace. Metric tensor calculator 400 analyzes pairs of latent patches with known coordinate relationships to understand how distances and angles behave in different regions of the hyperspace. For example, metric tensor calculator 400 might discover that temporal transitions require different scaling than spatial movements, or that spectral shifts in the infrared range have different continuity properties than visible light transitions. Metric tensor calculator 400 implements the mathematical framework for computing geodesic distances where a metric tensor can vary across the hyperspace to accommodate local geometric variations. The learned metric tensor enables the system to understand that a small change in zoom level (zeta) might require larger adjustments in the latent space than an equivalent change in spatial position, ensuring perceptually uniform navigation.

A geodesic path planner 410 uses the learned metric tensor to compute optimal paths between latent patches in the hyperspace. Geodesic path planner 410 implements numerical methods for solving geodesic equations, finding paths that minimize the integrated distance according to the metric tensor. When planning a complex navigation-such as simultaneously zooming in while rotating the viewpoint and advancing through time-geodesic path planner 410 computes a smooth trajectory that avoids regions of high curvature or discontinuity in the latent space. For instance, geodesic path planner 410 might determine that transitioning between two viewpoints is more efficient by first zooming out, then rotating, then zooming back in, rather than attempting a direct interpolation. Geodesic path planner 410 also identifies when multiple geodesic paths exist between points and can select paths based on additional criteria such as computational efficiency or visual quality.

A neural transition network 420 implements the learned transformation functions that map latent patches along geodesic paths. Neural transition network 420 consists of specialized neural architectures that can transform a source latent patch at position X into a target representation at position X+dX. The network architecture may include attention mechanisms that focus on different aspects of the latent representation depending on the type of transition-emphasizing motion vectors for temporal transitions or frequency components for spectral shifts. Neural transition network 420 is conditioned on both the displacement vector dX and the local context embedding, allowing it to adapt its behavior to different regions of the hyperspace. For example, neural transition network 420 might apply different transformation strategies in regions representing fast motion versus static scenes, or adjust its processing for transitions near object boundaries versus smooth backgrounds.

A training network 430 manages the learning process for all components of the transition function trainer 114. Training network 430 samples pairs of latent patches from hyperspace memory database 113 with various displacement relationships, creating a diverse training dataset that covers different types of transitions. Training network 430 implements a multi-objective loss function that includes latent similarity loss (ensuring transformed patches match target patches), geodesic consistency loss (maintaining path optimality), and curvature regularization loss (preventing excessive local distortion). For instance, training network 430 might sample a sequence of patches representing a zoom operation and train neural transition network 420 to accurately predict intermediate zoom levels while maintaining the geodesic properties defined by metric tensor calculator 400. Training network 430 can also implement curriculum learning strategies, starting with simple single-axis transitions before progressing to complex multi-dimensional navigation scenarios.

A validation controller 450 evaluates the quality and consistency of learned transition functions through systematic testing. Validation controller 450 maintains a held-out set of latent patch sequences that represent challenging navigation scenarios-such as transitions across scene boundaries, movements through sparsely populated regions, or navigations involving multiple simultaneous dimension changes. Validation controller 450 computes metrics including reconstruction error, path smoothness, and perceptual quality scores to ensure that learned transitions produce visually coherent results. For example, validation controller 450 might test whether a learned transition function can successfully interpolate between patches at different zoom levels without introducing artifacts or losing important details. Validation controller 450 also monitors for failure cases such as mode collapse or unstable regions in the transformation space, triggering retraining or architectural adjustments when necessary.

A context manager 460 maintains awareness of local hyperspace properties and provides context embeddings that help transition functions adapt to different regions. Context manager 460 analyzes the distribution of latent patches in local neighborhoods to understand regional characteristics—identifying areas of high density versus sparse coverage, regions with smooth versus sharp transitions, or domains with specific semantic properties. For instance, context manager 460 might recognize that a particular region of the hyperspace represents underwater scenes, where color and lighting transitions follow different patterns than terrestrial footage. Context manager 460 generates context embeddings that neural transition network 420 uses to specialize its transformations, ensuring that transitions remain appropriate to the local content type and maintaining consistency within semantic regions.

A random deployment interface 460 enables the deployment of trained transition functions to various system components and supports online updating of models. Random deployment interface 460 packages trained models in formats suitable for different deployment targets, from high-performance cloud servers to resource-constrained edge devices. Random deployment interface 460 can create specialized versions of transition functions optimized for specific use cases—such as lightweight models for mobile devices that handle only spatial navigation, or high-fidelity models for professional content creation that support all dimensional transitions. Random deployment interface 460 also implements versioning and rollback mechanisms, ensuring system stability when deploying updated models while maintaining backward compatibility with existing latent patch databases.

The transition function trainer 114 architecture enables the system to learn and maintain sophisticated navigation capabilities that go beyond simple interpolation. By understanding the geometric structure of the latent hyperspace and learning specialized transformation functions, transition function trainer 114 ensures that users can navigate smoothly through complex multidimensional media spaces. The combination of theoretical geometric frameworks with practical neural network implementations creates a flexible system that can adapt to different content types and navigation requirements while maintaining the mathematical consistency necessary for predictable, high-quality results.

Figure 5:
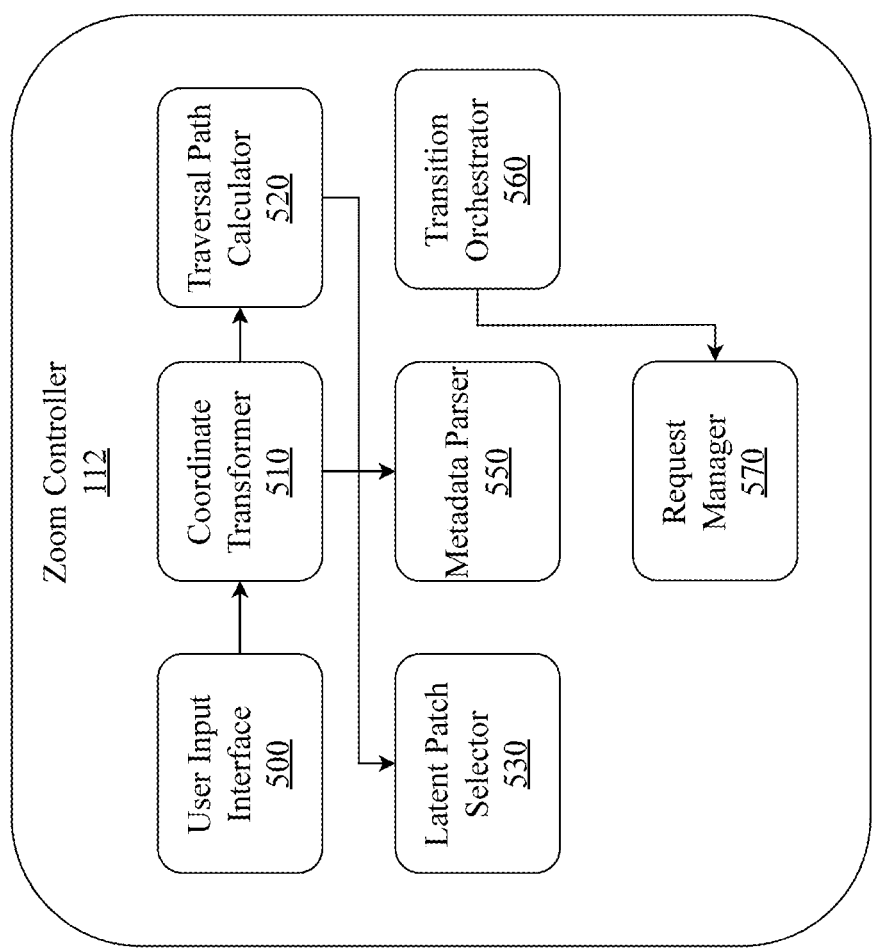
FIG. 5 is a block diagram illustrating an exemplary architecture for a zoom controller component of the multimodal latent hyperspace navigator.

FIG. 5 is a block diagram illustrating an exemplary architecture for a zoom controller component of the multi-modal latent hyperspace navigator. A user input interface 500 captures and interprets various forms of user interaction to initiate navigation through the hyperspace. User input interface 500 supports multiple input modalities including touch gestures (pinch for zoom, swipe for pan), mouse movements, keyboard commands, voice instructions, and specialized controllers for VR/AR environments. For example, user input interface 500 might interpret a two-finger rotation gesture as a request to change viewing angle (theta, phi), while a pinch gesture indicates zoom level adjustment (zeta). User input interface 500 implements gesture recognition algorithms that can distinguish between intentional navigation commands and incidental interactions, incorporating velocity and acceleration patterns to create natural-feeling controls. For professional applications like surveillance analysis, user input interface 500 might support precise numerical input for exact coordinate targeting or predefined navigation macros for common operations.

A coordinate transformer 510 converts user-centric navigation requests into precise hyperspace coordinate changes. Coordinate transformer 510 maintains awareness of the current position in the 7-dimensional hyperspace and calculates the required displacement vectors (dX) for each navigation command. When a user requests to "zoom in 2×," coordinate transformer 510 translates this into specific changes in the scale dimension (zeta) while potentially adjusting other coordinates to maintain visual coherence. For instance, zooming into a moving object might require coordinate transformer 510 to simultaneously adjust spatial coordinates (x, y) and temporal index (t) to keep the object centered during the zoom operation. Coordinate transformer 510 also implements coordinate system conversions, translating between user-friendly representations (like geographic coordinates or timecodes) and the internal hyperspace coordinate system.

A traversal path calculator 520 determines the optimal route through the hyperspace to achieve the desired navigation. Traversal path calculator 520 works closely with the geodesic mapping information from hyperspace memory database 113 to find paths that minimize perceptual distortion and computational cost. For complex navigations involving multiple dimensional changes, traversal path calculator 520 might decompose the movement into a sequence of simpler transitions. For example, when transitioning from a wide aerial view to a close-up of a specific object at a different time, traversal path calculator 520 might plan a path that first adjusts the temporal coordinate to the target timeframe, then performs the spatial zoom, rather than attempting simultaneous changes that might pass through sparsely populated regions of the hyperspace. Traversal path calculator 520 also considers available latent patches along potential paths, preferring routes through densely populated regions to minimize the need for generative synthesis.

A latent patch selector 530 identifies which latent patches are required to render the current view and anticipated future views based on the navigation trajectory. Latent patch selector 530 queries hyperspace memory database 113 to retrieve patches within the viewing frustum and preemptively fetches patches along the predicted navigation path. For smooth zoom operations, latent patch selector 530 might retrieve patches at multiple scale levels, enabling seamless level-of-detail transitions. Latent patch selector 530 implements sophisticated prediction algorithms that learn from user behavior patterns-if a user typically explores an area after zooming in, latent patch selector 530 preloads nearby spatial patches. The component also manages patch priorities, ensuring that critical patches for the current view are retrieved first, followed by predictive prefetches for likely future positions.

A metadata parser 550 processes the supplementary information associated with navigation operations and latent patches. Metadata parser 550 extracts viewing parameters such as field of view, aspect ratio, and quality preferences from user requests and system state. When retrieving latent patches, metadata parser 550 interprets their associated metadata to understand coverage boundaries, quality metrics, and relationship information. For example, metadata parser 550 might discover that certain patches were encoded with reduced spectral resolution and adjust the rendering pipeline accordingly. Metadata parser 550 also processes temporal metadata to maintain synchronization during time-based navigation, ensuring that audio tracks (if present) remain aligned with visual content during temporal traversal operations.

A transition orchestrator 560 coordinates the complex interplay between different system components during navigation operations. Transition orchestrator 560 manages the timing and sequencing of patch retrieval, transition function application, and rendering operations to maintain smooth visual continuity. When executing a navigation that requires both retrieved and generated patches, transition orchestrator 560 schedules the generative fill-in operations to complete before they're needed for display. For instance, during rapid zoom-out operations, transition orchestrator 560 might trigger parallel generation of intermediate zoom levels while displaying cached or lower-quality previews, then seamlessly substituting higher-quality results as they become available. Transition orchestrator 560 also monitors system performance and can dynamically adjust navigation speed or quality to maintain target frame rates.

A request manager 570 handles all communication with other system components to fulfill the navigation requirements. Request manager 570 batches and prioritizes requests to hyperspace memory database 113 for efficient retrieval, implementing request coalescing to reduce redundant queries. When patches are unavailable locally, request manager 570 coordinates with transmission layer 130 to fetch them from remote storage, managing bandwidth allocation and implementing progressive loading strategies. For example, request manager 570 might first request low-resolution versions of patches for immediate display, then upgrade to full resolution as bandwidth permits. Request manager 570 also interfaces with the generative fill-in module when traversing sparse regions, providing the necessary context information and managing the integration of synthetic patches into the navigation flow.

The zoom controller 112 architecture enables intuitive and responsive navigation through the complex multidimensional hyperspace while hiding the underlying complexity from users. By intelligently managing coordinate transformations, path planning, and resource allocation, zoom controller 112 creates a seamless exploration experience that feels as natural as navigating traditional 2D video while offering unprecedented freedom to move through space, time, scale, and spectral dimensions. The predictive capabilities and orchestration ensure that even resource-constrained devices can provide smooth, high-quality navigation experiences by anticipating user needs and optimizing system resources accordingly.

Figure 6:
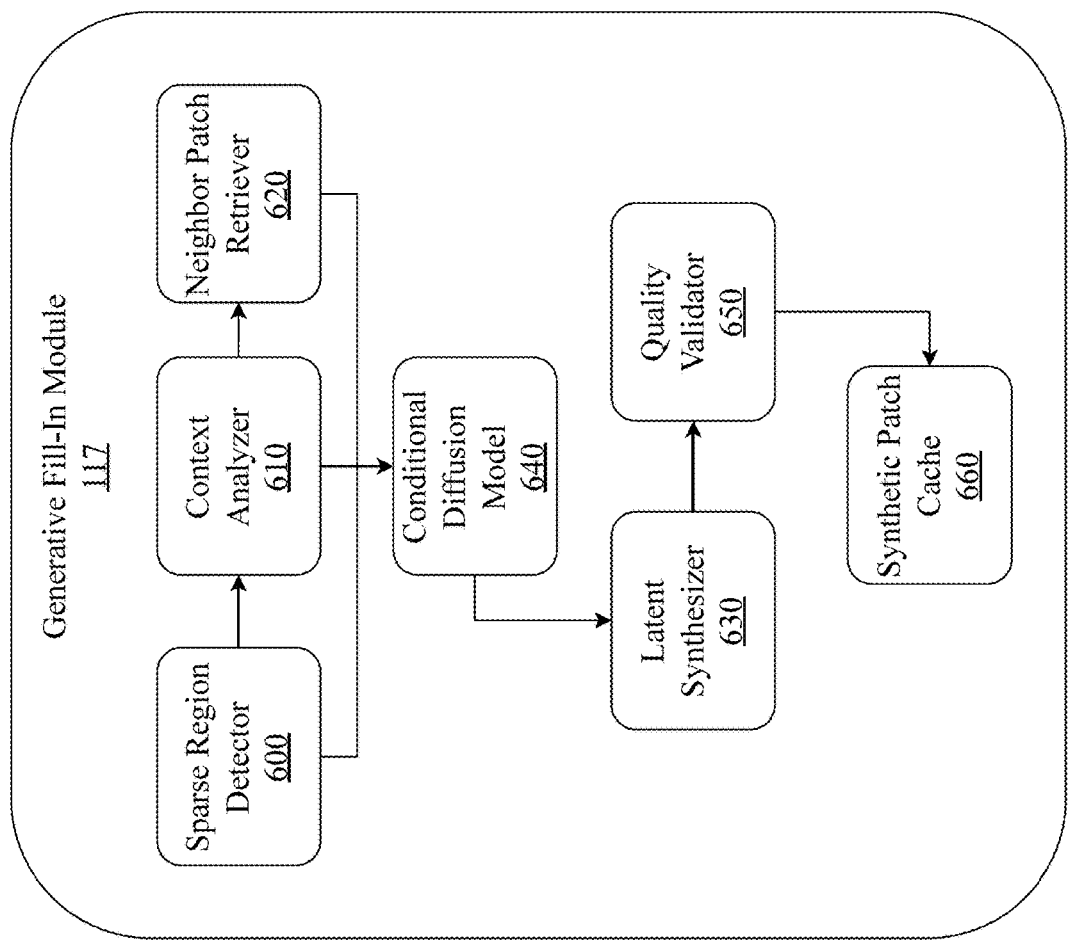
FIG. 6 is a block diagram illustrating an exemplary architecture for a generative fill-in module component of the multimodal latent hyperspace navigator.

FIG. 6 is a block diagram illustrating an exemplary architecture for a generative fill-in module component of the multimodal latent hyperspace navigator. The generative fill-in module 117 synthesizes plausible latent patches for sparsely populated regions of the hyperspace, enabling smooth navigation even when traversing areas without explicitly encoded content.

A sparse region detector 600 continuously monitors navigation requests and hyperspace coverage to identify when synthetic patch generation is required. Sparse region detector 600 analyzes the density of available latent patches around target coordinates by querying hyperspace memory database 113 and computing coverage metrics. When a navigation path crosses regions where the nearest existing patches exceed a threshold distance (typically measured using the learned metric tensor), sparse region detector 600 triggers the synthesis pipeline. For example, when a user attempts to zoom beyond the maximum encoded resolution or explores temporal regions between sparsely sampled frames, sparse region detector 600 identifies the specific coordinate ranges requiring synthesis. Sparse region detector 600 also maintains a sparsity map that tracks historically problematic regions, enabling proactive generation for frequently accessed sparse areas.

A context analyzer 610 examines the local hyperspace neighborhood to extract semantic and structural information that guides the synthesis process. Context analyzer 610 retrieves characteristics from nearby patches including content type (e.g., indoor/outdoor scenes, fast/slow motion), dominant features (edges, textures, objects), and spectral properties. For instance, when generating a patch between two time points in a nature documentary, context analyzer 610 might identify consistent lighting conditions, gradual cloud movement patterns, and stable camera positioning that should be preserved in the synthetic content. Context analyzer 610 generates a local context embedding C_X that encapsulates these neighborhood properties, providing crucial conditioning information for the generative model. The analyzer also identifies discontinuities or scene boundaries where synthesis strategies might need adjustment to avoid inappropriate blending of disparate content.

A neighbor patch retriever 620 fetches the most relevant existing latent patches that will serve as reference points for synthesis. Neighbor patch retriever 620 implements sophisticated selection strategies that go beyond simple nearest-neighbor retrieval, considering factors such as geodesic distance, semantic similarity, and directional relevance along the navigation path. For temporal interpolation, neighbor patch retriever 620 might retrieve patches from before and after the target time, while for spatial exploration, it might prioritize patches that share similar viewing angles or scale levels. Neighbor patch retriever 620 typically retrieves 4-8 reference patches, balancing comprehensive context with computational efficiency. The retriever also accesses the geodesic path information to ensure retrieved patches lie along plausible transition routes, avoiding references that might introduce inconsistencies.

A conditional diffusion model 640 forms the core generative engine that synthesizes new latent patches based on the provided context and references. Conditional diffusion model 640 implements a denoising diffusion probabilistic model architecture specifically designed for latent space generation rather than pixel-space synthesis. The model takes as input the local context embedding C_X, the hyperspace displacement vector dX indicating the target position relative to known patches, and features extracted from the retrieved neighbor patches. Through an iterative denoising process, conditional diffusion model 640 generates latent arrays that maintain consistency with the Lorentzian structure of the hyperspace. For example, when synthesizing an intermediate zoom level, the model learns to appropriately blend high-frequency details that appear at higher zoom with the broader spatial context from lower zoom levels. Conditional diffusion model 640 can be trained on withheld patches from hyperspace memory database 113, learning to reconstruct known patches from their neighbors to ensure generation quality.

A latent synthesizer 630 processes the raw output from conditional diffusion model 640 to produce properly formatted latent patches compatible with the system architecture. Latent synthesizer 630 ensures the generated latent arrays maintain the correct dimensionality (e.g., 16×16×32 for standard patches) and value ranges expected by downstream components. Latent synthesizer 630 also performs structure enforcement to maintain the Lorentzian properties of the latent space, potentially applying learned transformations that ensure the synthetic patches integrate smoothly with existing content. For instance, latent synthesizer 630 might apply normalization procedures that preserve the geodesic distances between the synthetic patch and its neighbors. Additionally, latent synthesizer 630 can generate multiple variants of a patch at different quality levels, enabling progressive refinement during navigation.

A quality validator 650 assesses the perceptual and structural quality of generated patches before they are integrated into the navigation pipeline. Quality validator 650 implements multiple validation criteria including reconstruction quality (how well the patch decodes to plausible content), consistency metrics (whether the patch maintains appropriate relationships with neighbors), and confidence scores (the model's certainty in the generation). For example, quality validator 650 might detect when conditional diffusion model 640 produces a patch with unusual statistical properties suggesting mode collapse or failure to capture the local context. Quality validator 650 can trigger regeneration with adjusted parameters or flag patches for special handling during rendering. The validator also computes quality metrics that accompany synthetic patches through the system, enabling downstream components to make informed decisions about their use.

A synthetic patch cache 660 stores generated patches for efficient reuse during subsequent navigation operations. Synthetic patch cache 660 implements specialized storage strategies that differentiate synthetic content from original encoded patches while maintaining quick access patterns. Each cached synthetic patch includes metadata describing its generation context, including the reference patches used, generation parameters, quality scores, and validity timeframe. For instance, synthetic patch cache 660 might mark patches generated for fast-moving scenes with shorter validity periods, as they become less accurate as real time progresses. Synthetic patch cache 660 coordinates with hyperspace memory database 113 to ensure synthetic patches are replaced when real encoded data becomes available for previously sparse regions. The cache implements eviction policies that consider both access patterns and generation cost, potentially keeping frequently accessed synthetic patches even when memory pressure exists.

The generative fill-in module 117 architecture enables the system to provide seamless navigation experiences even when traversing regions of the hyperspace that lack encoded data.

By combining contextual understanding with sophisticated generative modeling, the module produces synthetic content that maintains visual and structural consistency with surrounding regions. This capability is essential for applications ranging from creative exploration beyond recorded content boundaries to practical scenarios like surveillance systems where continuous coverage cannot be guaranteed. The integration of quality validation and intelligent caching ensures that synthetic content enhances rather than degrades the user experience, while the system remains transparent about which content is generated versus originally encoded.

Figure 7:
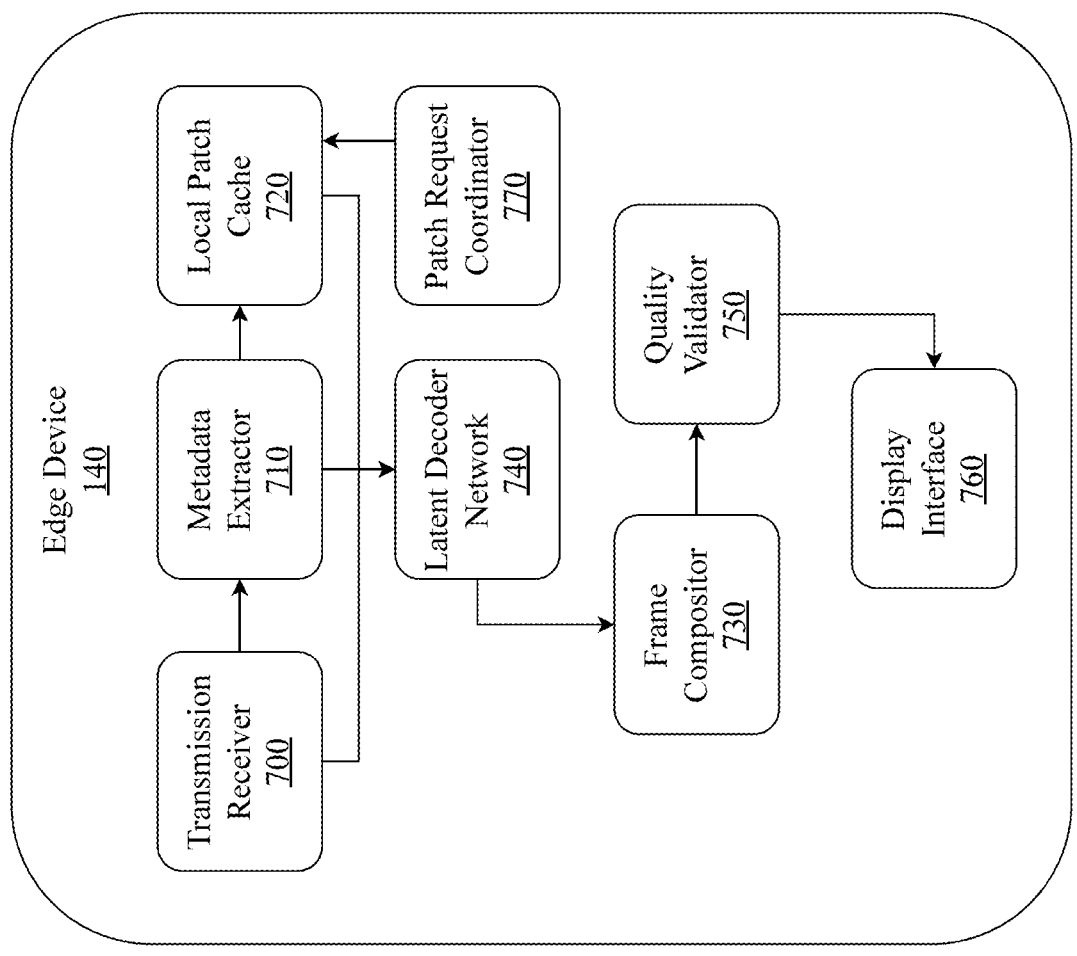
FIG. 7 is a block diagram illustrating an exemplary architecture for an edge device component of the multimodal latent hyperspace navigator.

FIG. 7 is a block diagram illustrating an exemplary architecture for an edge device component of the multimodal latent hyperspace navigator. Edge device 140 represents the client-side deployment platform that reconstructs and displays video content from compressed latent representations, operating within the computational and memory constraints of devices such as set-top boxes, mobile devices, or AR/VR headsets.

A transmission receiver 700 manages the incoming data stream from transmission layer 130, handling the reception of compressed latent patches, metadata packets, and control signals. Transmission receiver 700 implements adaptive buffering strategies that accommodate variable network conditions, maintaining smooth playback even during bandwidth fluctuations. For example, when network quality degrades, transmission receiver 700 might prioritize receiving patches for the current viewing position while deprioritizing speculative prefetch data. Transmission receiver 700 also performs packet reassembly, error detection, and correction, ensuring that received latent patches maintain integrity despite potential transmission errors. The receiver implements multiple reception modes including live streaming for real-time content, progressive download for on-demand viewing, and burst reception for efficient battery usage in mobile devices.

A metadata extractor 710 parses the supplementary information accompanying each latent patch to understand viewing context and reconstruction requirements. Metadata extractor 710 decodes viewing parameters including the hyperspace coordinates (x, y, z, theta, phi, t, zeta, lambda), field of view specifications, quality indicators, and temporal synchronization markers. For instance, when receiving patches for a multi-view video experience, metadata extractor 710 extracts the precise viewing angle and ensures proper alignment with user head position in VR applications. Metadata extractor 710 also processes traversal hints that indicate likely future navigation directions, enabling intelligent prefetching decisions. The component maintains a metadata index that correlates patches with their hyperspace positions, supporting efficient lookup during navigation operations.

A local patch cache 720 provides storage for latent patches within the memory constraints of the edge device. Local patch cache 720 implements sophisticated cache management policies that balance multiple factors including patch access frequency, reconstruction cost, predictive importance, and memory pressure. Unlike server-side caching, local patch cache 720 must operate within strict memory limits—perhaps only 100-500 MB on a set-top box—requiring aggressive prioritization. For example, local patch cache 720 might maintain patches along the current navigation trajectory while aggressively evicting patches from abandoned exploration paths. The cache implements compression techniques specifically optimized for latent representations, potentially achieving additional compression through vector quantization or sparse coding methods suitable for edge device processors.

A latent decoder network 740 performs the actual reconstruction of visual frames from latent patch representations. Latent decoder network 740 implements an efficient neural architecture optimized for edge device deployment, utilizing techniques such as model quantization, layer pruning, and specialized operations that map well to available hardware accelerators. For instance, on devices with neural processing units (NPUs), latent decoder network 740 might utilize int8 quantized weights and activations while maintaining visual quality. The decoder processes 16×16 or 32×32 latent arrays to reconstruct full-resolution frames, implementing progressive decoding that can quickly generate preview quality images while continuing to refine details. Latent decoder network 740 adapts its processing based on device capabilities and thermal constraints, potentially reducing decode quality to maintain consistent frame rates during extended viewing sessions.

A frame compositor 730 assembles the final display frames from multiple decoded patches, handling boundary blending, resolution matching, and temporal interpolation. Frame compositor 730 becomes particularly important during complex navigation operations that might require combining patches from different zoom levels or viewing angles. For example, during a zoom transition, frame compositor 730 might blend the decoded output from patches at multiple scale levels to create smooth intermediate frames. Frame compositor 730 implements edge-aware blending algorithms that prevent visible seams between patches while maintaining computational efficiency. The compositor also handles format conversion to match display requirements, such as converting reconstructed frames to the appropriate color space or adapting aspect ratios for different screen formats.

A quality validator 750 monitors the visual quality of reconstructed content and provides feedback for adaptive quality control. Quality validator 750 implements lightweight perceptual quality metrics that can run in real-time on edge devices, detecting artifacts such as blocking, blurring, or temporal inconsistencies. When quality falls below acceptable thresholds, quality validator 750 can trigger various remediation strategies: requesting higher-quality patches from patch request coordinator 770, adjusting decoder parameters, or modifying compositor blending strategies. For instance, if quality validator 750 detects severe artifacts during rapid navigation, it might temporarily reduce motion speed to allow higher-quality patches to load. The validator also tracks quality metrics over time, providing usage analytics that can inform system optimization.

A display interface 760 manages the final presentation of reconstructed frames to the user's display device. Display interface 760 handles platform-specific display APIs, synchronization with display refresh rates, and color management to ensure optimal visual presentation. For high-dynamic-range (HDR) capable displays, display interface 760 might process metadata to properly map the reconstructed content's luminance range. Display interface 760 implements frame pacing algorithms that maintain smooth motion despite potential variations in decode timing, using techniques such as adaptive vsync and frame interpolation. For AR/VR devices, display interface 760 coordinates with head tracking systems to ensure proper stereoscopic rendering and low-latency response to head movements.

A patch request coordinator 770 manages all upstream communication for requesting additional latent patches when local cache 720 cannot satisfy navigation requirements. Patch request coordinator 770 implements intelligent request strategies that balance immediate needs with predictive prefetching, bundling multiple patch requests to reduce communication overhead. When cache misses occur, patch request coordinator 770 prioritizes requests based on visual importance and user navigation patterns. For example, patches directly in the viewing frustum receive highest priority, followed by patches along the predicted navigation path. Patch request coordinator 770 also implements request pacing to avoid overwhelming the network or server infrastructure, potentially queuing lower-priority requests during peak usage periods. The coordinator maintains awareness of which patches are synthetic versus original, preferentially requesting original encoded patches to replace synthetic ones when available.

The edge device 140 architecture enables high-quality video reconstruction and navigation on resource-constrained platforms by carefully balancing computational efficiency, memory usage, and visual quality. Through intelligent caching, adaptive processing, and sophisticated request management, edge device 140 provides users with seamless exploration of vast media spaces while operating within the practical limitations of consumer hardware. The architecture's flexibility allows it to scale from basic set-top boxes delivering standard video to advanced AR/VR headsets enabling fully immersive hyperspace navigation experiences.

Figure 8:
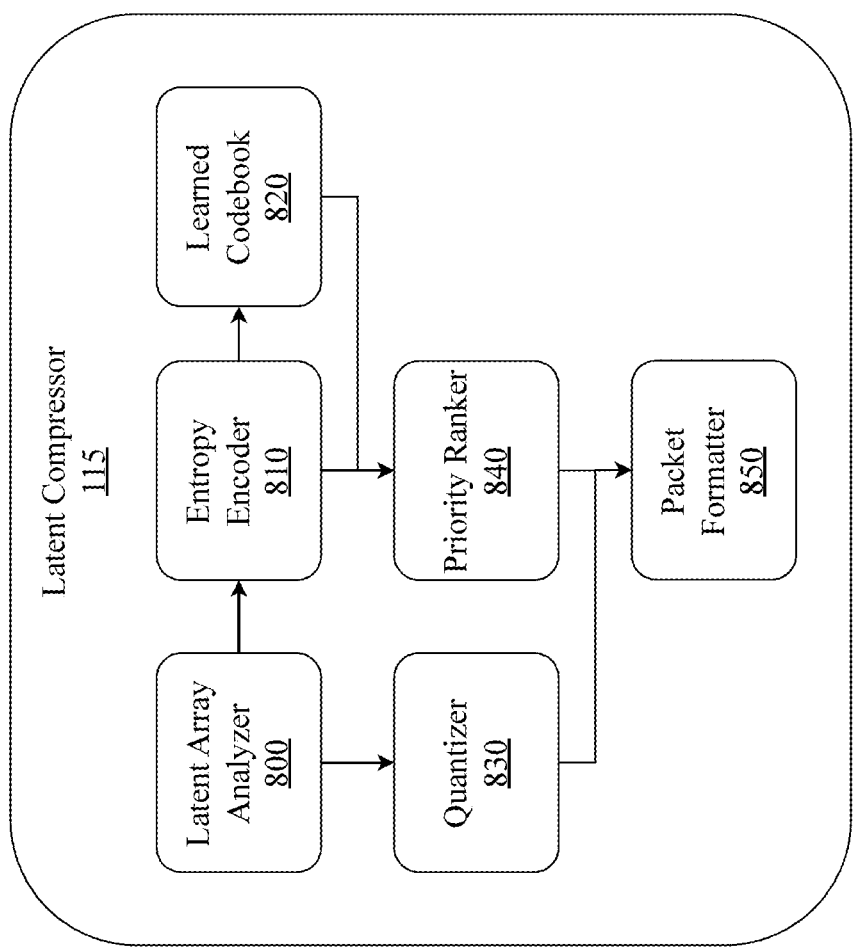
FIG. 8 is a block diagram illustrating an exemplary architecture for a latent compressor component of the multimodal latent hyperspace navigator.

FIG. 8 is a block diagram illustrating an exemplary architecture for a latent compressor component of the multimodal latent hyperspace navigator. Latent compressor 115 optimizes the encoded latent representations for efficient transmission and storage, achieving additional compression beyond the already compact latent patches while maintaining the quality necessary for high-fidelity reconstruction.

A latent array analyzer 800 examines the statistical properties and structural patterns within latent patches to inform optimal compression strategies. Latent array analyzer 800 processes the 2D latent arrays (typically 16×16 or 32×32 with multiple channels) output by encoder 111, identifying characteristics such as sparsity patterns, channel correlations, and value distributions. For example, latent array analyzer 800 might discover that certain channels in patches representing static backgrounds exhibit high sparsity, while channels encoding motion information show different statistical properties. Latent array analyzer 800 also performs cross-patch analysis to identify redundancies between spatially or temporally adjacent patches, enabling differential encoding strategies. The analyzer generates compression hints including recommended quantization levels, suitable codebook entries, and priority rankings that guide subsequent compression stages. For specialized content like scientific imagery, latent array analyzer 800 can detect domain-specific patterns that require preservation of particular latent dimensions.

An entropy encoder 810 applies information-theoretic compression techniques to reduce the bit rate of latent representations. Entropy encoder 810 implements adaptive arithmetic coding or asymmetric numeral systems that exploit the statistical regularities identified by latent array analyzer 800. Rather than treating the latent array as uniform data, entropy encoder 810 models different regions and channels with context-specific probability distributions. For instance, entropy encoder 810 might use different entropy coding contexts for latent values representing spatial structures versus those encoding temporal dynamics. The encoder maintains multiple probability models that adapt to local statistics, switching between models based on the latent patch characteristics. Entropy encoder 810 achieves typical compression ratios of 2-4× on top of the inherent compression from the latent representation, with higher ratios possible for patches with strong statistical regularities.

A learned codebook 820 stores frequently occurring latent patterns that can be referenced instead of transmitted explicitly. Learned codebook 820 is trained on large corpuses of latent patches to identify common structures, textures, and features that appear across different content types. Rather than simple vector quantization, learned codebook 820 implements hierarchical and compositional codebooks that can represent complex patterns through combinations of simpler elements. For example, a codebook entry might represent a common edge pattern that appears at certain zoom levels, or a characteristic temporal transition pattern. Learned codebook 820 supports multiple specialized codebooks for different content domains-surveillance footage might use different codebooks than cinematic content or scientific imagery. The codebook system includes mechanisms for online updates, allowing new patterns to be added as they are discovered during system operation.

A quantizer 830 reduces the precision of latent values based on perceptual importance and available bandwidth. Quantizer 830 implements adaptive quantization strategies that allocate bits based on the visual impact of different latent dimensions. Unlike uniform quantization, quantizer 830 uses the analysis from latent array analyzer 800 to apply different quantization levels to different channels or spatial regions within a latent patch. For instance, latent dimensions that primarily affect high-frequency details might be quantized more aggressively when bandwidth is constrained, while dimensions affecting overall structure receive finer quantization. Quantizer 830 also implements temporal quantization strategies, allocating more bits to keyframe patches while using coarser quantization for predictable intermediate frames. The quantizer can dynamically adjust its aggressiveness based on real-time bandwidth measurements from transmission layer 130.

A priority ranker 840 determines the transmission order and quality levels for compressed patches based on multiple factors including viewing likelihood, visual importance, and navigation predictions. Priority ranker 840 integrates information from zoom controller 112 about current and predicted navigation paths to assign transmission priorities. Patches directly in the current viewing frustum receive highest priority, followed by patches along likely navigation trajectories. Priority ranker 840 also considers content-based importance-patches containing detected objects or high motion might receive priority over static background regions. For streaming scenarios, priority ranker 840 implements quality ladders where base quality versions of all relevant patches are transmitted first, followed by enhancement layers. The ranker maintains fairness mechanisms to ensure that no regions become permanently starved of bandwidth while also supporting quality-of-service differentiation for multiple simultaneous users.

A packet formatter 850 assembles the compressed latent data into transmission-ready packets optimized for network delivery. Packet formatter 850 implements packetization strategies that balance packet size efficiency with error resilience and latency requirements. Each packet includes not only compressed latent data but also essential metadata for reconstruction including hyperspace coordinates, compression parameters, and codebook references. Packet formatter 850 supports multiple packet formats optimized for different transmission scenarios small packets for low-latency mobile networks, larger packets for efficient bulk transfer, and specialized formats for multicast delivery. The formatter implements forward error correction codes and packet interleaving strategies to improve resilience against network losses. For example, packet formatter 850 might distribute a single latent patch across multiple packets with redundancy coding, ensuring that the patch can be reconstructed even if some packets are lost.

The latent compressor 115 architecture enables efficient delivery of latent hyperspace content across bandwidth-constrained networks while maintaining the quality necessary for immersive navigation experiences. By combining statistical analysis, learned compression strategies, and adaptive prioritization, latent compressor 115 can reduce bandwidth requirements by orders of magnitude compared to traditional video streaming. The system's flexibility allows it to adapt to diverse deployment scenarios, from high-bandwidth fiber connections enabling full-quality exploration to mobile networks where aggressive compression and prioritization ensure usable navigation even under challenging conditions. The tight integration between compression decisions and navigation predictions ensures that bandwidth is allocated optimally to support the user's exploration of the multidimensional media space.

Figure 9:
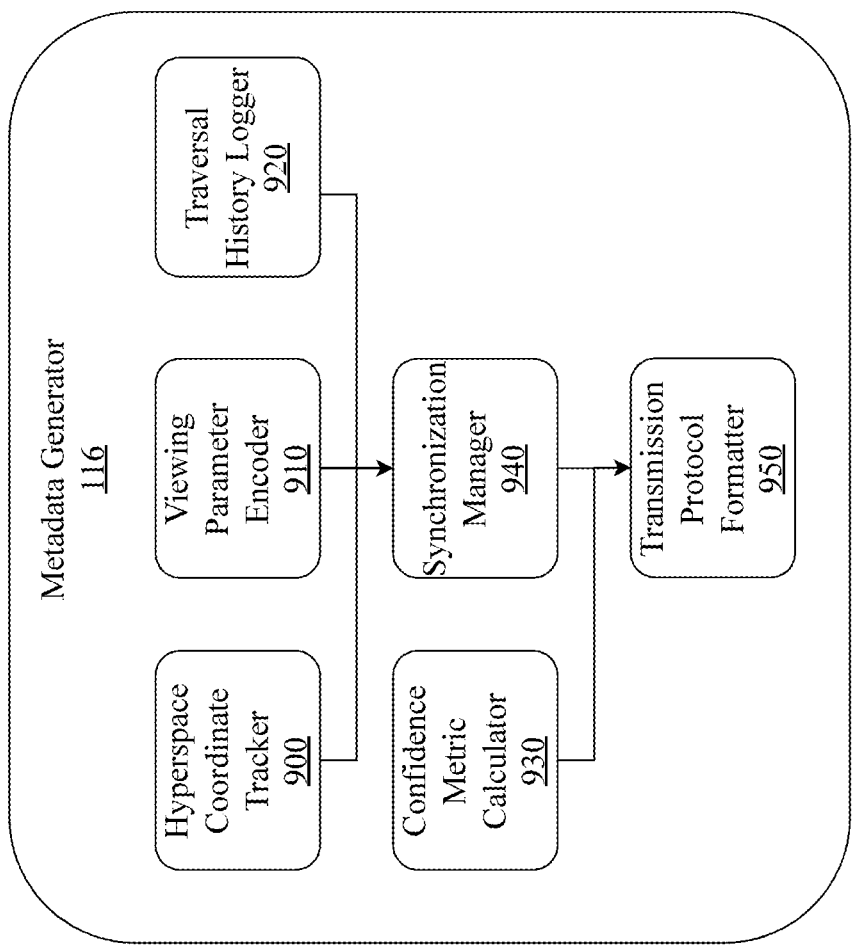
FIG. 9 is a block diagram illustrating an exemplary architecture for a metadata generator component of the multimodal latent hyperspace navigator.

FIG. 9 is a block diagram illustrating an exemplary architecture for a metadata generator component of the multimodal latent hyperspace navigator. Metadata generator 116 creates and maintains comprehensive descriptive information that accompanies latent patches throughout the system, enabling coordinated navigation, synchronization, and quality-aware reconstruction.

A hyperspace coordinate tracker 900 maintains precise awareness of positions within the 7-dimensional hyperspace for all active navigation sessions and encoded content. Hyperspace coordinate tracker 900 generates unique coordinate tuples (x, y, z, theta, phi, t, zeta, lambda) for each latent patch, ensuring consistent addressing across the distributed system. When tracking active user sessions, hyperspace coordinate tracker 900 maintains high-precision floating-point representations of positions even between discrete patch locations, enabling smooth interpolation during navigation. For example, during a continuous zoom operation, hyperspace coordinate tracker 900 might track the zeta coordinate at microsecond intervals to ensure frame-accurate synchronization with user input. Hyperspace coordinate tracker 900 also implements coordinate transformation services, converting between different reference frames such as geographic coordinates for spatial dimensions, standard timecodes for temporal positions, and scientific wavelength measurements for spectral bands. The tracker maintains coordinate histories that enable reverse navigation and session replay functionality.

A viewing parameter encoder 910 captures and encodes the complete set of parameters defining how content should be rendered from latent patches. Viewing parameter encoder 910 processes information including field of view angles, aspect ratios, display resolution targets, color space specifications, and perceptual preference settings. For immersive applications, viewing parameter encoder 910 might encode stereoscopic viewing parameters, interpupillary distance adjustments, and head-mounted display characteristics. The encoder creates compact parameter sets that can efficiently accompany latent patches without significant overhead-typically 100-200 bytes per patch. Viewing parameter encoder 910 also supports parameter inheritance and differential encoding, where only changes from default or previous values need to be transmitted. For example, during stable playback, viewing parameters might remain constant across many patches, requiring only periodic full parameter refreshes with incremental updates in between.

A traversal history logger 920 records the navigation paths taken by users through the hyperspace, creating valuable data for predictive prefetching and system optimization. Traversal history logger 920 captures not just the sequence of coordinates visited but also navigation velocities, dwell times, and interaction patterns. For instance, traversal history logger 920 might record that users typically pause for 2-3 seconds after zooming in before beginning to pan, enabling predictive algorithms to prioritize patches in the current view during this stabilization period. The logger implements privacy-preserving aggregation techniques that can identify common navigation patterns across users without storing individual session details. Traversal history logger 920 also generates navigation signatures that characterize different exploration styles-some users might prefer smooth, continuous movements while others navigate in discrete jumps between points of interest.

A confidence metric calculator 930 assesses the quality and reliability of latent patches and their associated metadata. Confidence metric calculator 930 computes multiple confidence scores including encoding quality (based on reconstruction error during training), completeness (whether all expected dimensions are present), freshness (time since encoding for dynamic content), and coverage (density of neighboring patches). For synthetic patches generated by generative fill-in module 117, confidence metric calculator 930 assigns specialized scores reflecting generation uncertainty and validation results. The calculator produces both absolute confidence values and relative rankings that help downstream components make informed decisions. For example, edge device 140 might use confidence metrics to decide whether to display a lower-confidence patch immediately or wait for a higher-confidence alternative. Confidence metric calculator 930 also tracks confidence degradation over time, particularly important for patches representing dynamic scenes where temporal validity decreases.

A synchronization manager 940 ensures temporal and spatial alignment across multiple latent patches during complex navigation and multi-stream scenarios. Synchronization manager 940 generates synchronization timestamps with microsecond precision, accounting for encoding delays, transmission latencies, and decode processing times. For multi-view experiences, synchronization manager 940 maintains precise alignment between patches from different camera angles, ensuring that simultaneous events appear synchronized when users switch viewpoints. The manager implements synchronization protocols that can accommodate patches arriving out of order or with variable delays. For example, when streaming a live sports event with multiple camera angles, synchronization manager 940 ensures that a goal scored appears at the same moment regardless of which view the user selects. Synchronization manager 940 also handles audio-visual synchronization when the system includes audio streams, maintaining lip-sync accuracy during navigation operations that might affect temporal positioning.

A transmission protocol formatter 950 packages all generated metadata into efficient transmission formats optimized for different network protocols and deployment scenarios. Transmission protocol formatter 950 supports multiple serialization formats including binary protocols for maximum efficiency, JSON for interoperability, and specialized formats for broadcast distribution. The formatter implements metadata compression techniques that exploit redundancies across multiple patches-common viewing parameters might be transmitted once with reference indices for subsequent patches. Transmission protocol formatter 950 creates packet headers that enable quick metadata extraction without full packet parsing, critical for edge devices with limited processing power. For multicast scenarios, the formatter can create hierarchical metadata streams where base information is broadcast to all receivers while personalized parameters use unicast channels. The formatter also implements metadata versioning and compatibility mechanisms, ensuring that newer metadata formats remain parseable by older edge devices while enabling advanced features for updated clients.

The metadata generator 116 architecture provides the essential contextual information that transforms raw latent patches into a navigable, synchronized media experience. By maintaining precise coordinate tracking, comprehensive viewing parameters, and quality metrics, metadata generator 116 enables the distributed system components to work in concert despite operating independently. The synchronization capabilities ensure that complex multi-dimensional navigation remains coherent and responsive, while the efficiency of metadata encoding ensures that this rich contextual information doesn't significantly impact bandwidth requirements. This metadata infrastructure is fundamental to enabling the advanced navigation capabilities of the latent hyperspace system, from simple video playback to complex multi-dimensional exploration across space, time, scale, and spectrum.

Detailed Description of Exemplary Aspects

Figure 10:
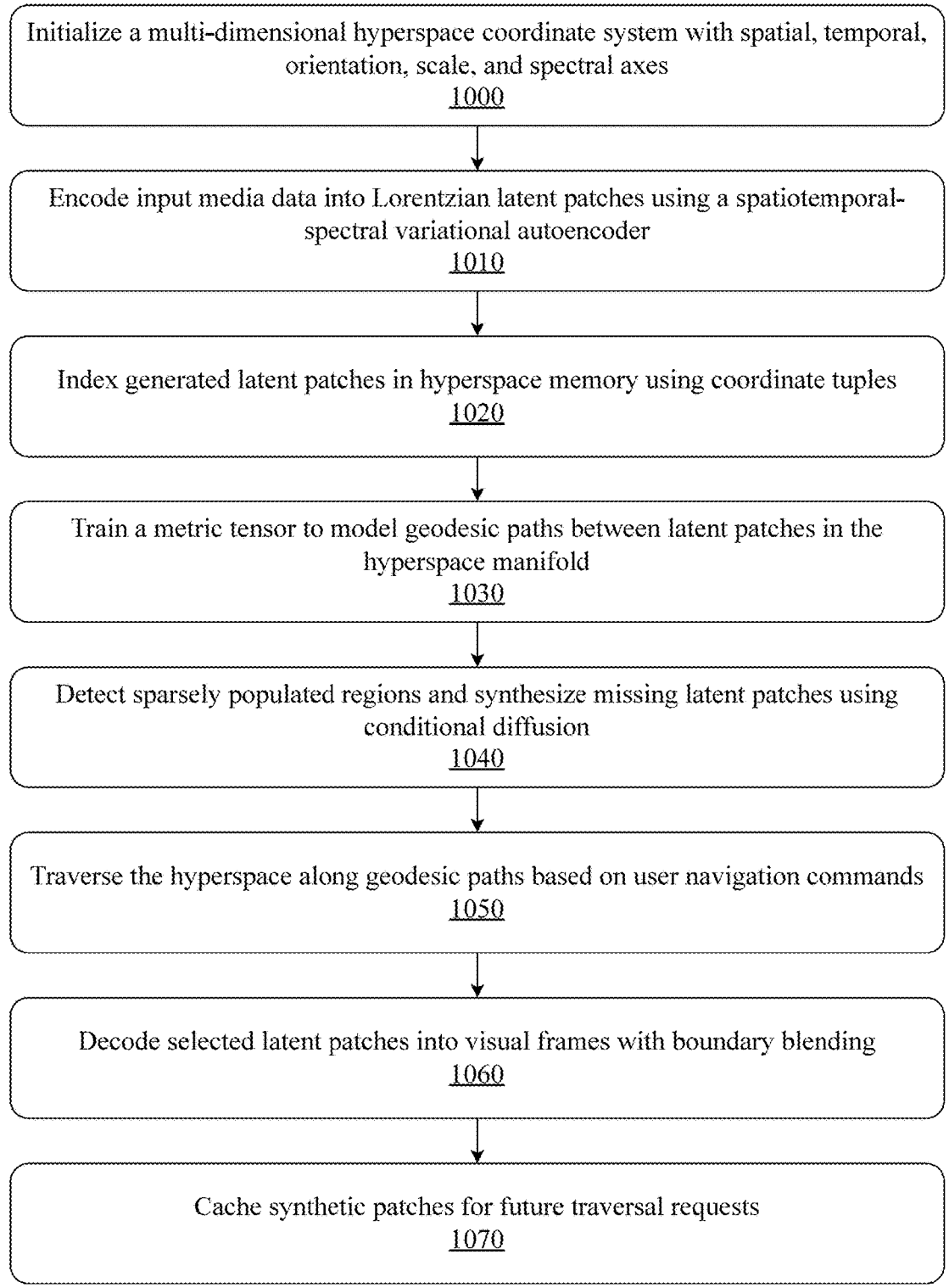
FIG. 10 is a flow diagram illustrating an exemplary method for navigating spatiotemporal and spectral media through a structured latent hyperspace representation.

FIG. 10 is a flow diagram illustrating an exemplary method for navigating spatiotemporal and spectral media through a structured latent hyperspace representation. In a first step 1000, a multi-dimensional hyperspace coordinate system is initialized with spatial, temporal, orientation, scale, and spectral axes. This initialization establishes the mathematical framework that governs all subsequent navigation and storage operations. The spatial dimensions (x, y, z) define position within three-dimensional space, supporting applications from traditional 2D video to volumetric captures and 3D reconstructions. The orientation parameters (theta, phi) specify viewing angles, enabling free viewpoint navigation around subjects or scenes. The temporal axis (t) represents time progression, supporting both linear playback and non-linear temporal exploration. The scale axis (zeta) enables continuous zooming from macro to micro perspectives, while the spectral axis (lambda) spans wavelength ranges from ultraviolet through visible to infrared and beyond. During initialization, coordinate bounds, resolution parameters, and transformation matrices are established to relate hyperspace coordinates to real-world measurements. For example, spatial coordinates might map to geographic locations for satellite imagery or to millimeter-precise positions for medical imaging applications.

In a step 1010, input media data is encoded into Lorentzian latent patches using a spatiotemporal-spectral variational autoencoder. This encoding process transforms high-dimensional raw media into compact representations that preserve essential information while enabling efficient navigation. The variational autoencoder processes kernel-sized segments of the input data, where each kernel captures a local neighborhood across multiple dimensions. For instance, a kernel might encompass a 64×64 pixel spatial region, 5 temporal frames, and 16 spectral bands, creating a rich multidimensional representation of that hyperspace region. The autoencoder architecture includes specialized processing pathways for different dimensional aspects-convolutional layers for spatial structure, recurrent or attention mechanisms for temporal relationships, and spectral decomposition modules for wavelength information. The Lorentzian constraint on the latent space ensures that distances in the latent representation reflect meaningful relationships rather than arbitrary feature differences. This encoding achieves significant compression ratios while maintaining the ability to reconstruct high-quality outputs, accomplished by exploiting redundancies across all captured dimensions simultaneously.

In a step 1020, generated latent patches are indexed in hyperspace memory using coordinate tuples. Each latent patch receives a unique address specified by its complete coordinate tuple (x, y, z, theta, phi, t, zeta, lambda), enabling efficient retrieval during navigation operations. The indexing process employs specialized data structures optimized for high-dimensional queries, such as k-d trees or learned index structures that can quickly locate patches based on various search criteria. Multiple access patterns are supported including point queries for specific coordinates, range queries for spatial regions, and trajectory queries for navigation paths. Metadata associated with each patch, including quality metrics, encoding parameters, and relationship pointers, is stored alongside the coordinate index. The indexing infrastructure scales to accommodate millions or billions of latent patches while maintaining sub-millisecond query response times through hierarchical organization and intelligent caching strategies.

In a step 1030, a metric tensor is trained to model geodesic paths between latent patches in the hyperspace manifold. This training process learns the geometric structure of the latent space by analyzing relationships between patches with known coordinate displacements. The metric tensor defines how distances and angles behave in different regions of the hyperspace, capturing the fact that movement along different dimensions may require different amounts of change in the latent representation. Training involves sampling pairs of latent patches, computing their coordinate differences, and optimizing the metric tensor to accurately predict the latent-space distance between them. The learned metric enables planning of smooth navigation paths that minimize perceptual distortion—for example, determining that transitioning between two viewpoints is more natural when following a curved path that maintains consistent object appearance rather than a direct linear interpolation. The metric tensor can vary across the hyperspace, adapting to local content characteristics such as higher curvature near object boundaries or scene transitions.

In a step 1040, sparsely populated regions are detected and missing latent patches are synthesized using conditional diffusion. During navigation, the density of available patches around the current position and along predicted trajectories is continuously monitored. When gaps are detected—regions where no encoded patches exist within a threshold distance—the synthesis process activates. The conditional diffusion model takes as input the nearest available patches, the target coordinates for synthesis, and a local context embedding that captures neighborhood characteristics. Through an iterative denoising process, the model generates plausible latent representations that maintain consistency with surrounding content. For example, when synthesizing patches between two temporal keyframes, the model generates smooth motion transitions that respect object trajectories and scene dynamics. The synthesis process adapts to different types of sparse regions, using different generation strategies for temporal gaps versus spatial exploration beyond recorded boundaries.

In a step 1050, the hyperspace is traversed along geodesic paths based on user navigation commands. User inputs such as zoom gestures, pan movements, or timeline scrubbing are translated into target coordinates within the hyperspace. Optimal geodesic paths from the current position to the destination are computed using the learned metric tensor to find routes that minimize perceptual distortion. During traversal, relevant latent patches along the path are retrieved, potentially invoking synthesis for missing segments. Smooth interpolation between discrete patch positions creates fluid motion even when navigating between sparsely sampled regions. For complex multi-dimensional movements—such as simultaneously zooming while rotating and advancing in time—the navigation may be decomposed into a sequence of simpler transitions that avoid poorly populated regions or maintain visual coherence.

In a step 1060, selected latent patches are decoded into visual frames with boundary blending. The decoding process transforms compact latent representations back into viewable content using neural decoder networks optimized for efficiency and quality. When multiple patches contribute to a single view—common during transitions or when combining different scale levels—sophisticated blending algorithms prevent visible seams. Boundary blending considers both spatial adjacency and the latent-space relationships between patches, using the metric tensor to weight contributions appropriately. For example, when decoding a view that spans multiple patches at different zoom levels, the blending process gives higher weight to patches whose scale parameter more closely matches the target viewing scale. Adaptive quality enhancement can be performed, allocating more computational resources to visually important regions while using faster approximate decoding for peripheral areas.

In a step 1070, synthetic patches are cached for future traversal requests. Generated patches from the synthesis process are stored in a specialized cache that distinguishes them from originally encoded content while maintaining quick access for repeated navigation through the same regions. Intelligent retention policies consider factors such as generation cost, access frequency, and available storage capacity. Synthetic patches are tagged with metadata indicating their generation parameters, quality scores, and validity timeframes-patches representing dynamic scenes may have shorter validity than those representing static content. The cache coordinates with the main hyperspace memory to ensure synthetic patches are replaced with real encoded data when it becomes available. This caching strategy significantly improves navigation performance in frequently explored sparse regions while maintaining awareness of which content is synthesized versus originally captured.

Figure 11:
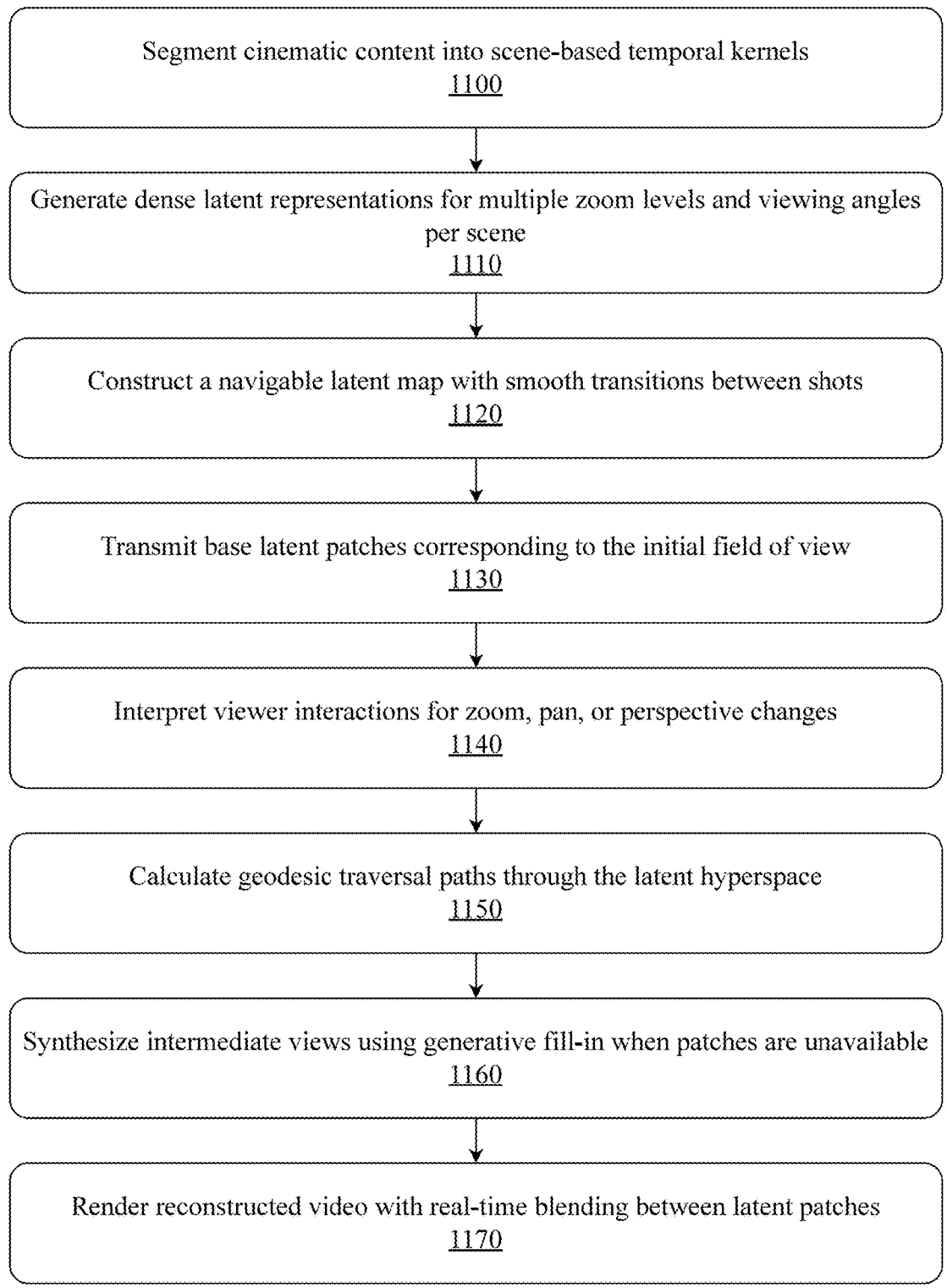
FIG. 11 is a flow diagram illustrating an exemplary method for enabling immersive exploration of cinematic content through latent hyperspace navigation.

FIG. 11 is a flow diagram illustrating an exemplary method for enabling immersive exploration of cinematic content through latent hyperspace navigation. In a first step 1100, cinematic content is segmented into scene-based temporal kernels. This segmentation process analyzes the narrative structure and visual coherence of film content to identify natural boundaries between scenes, shots, and sequences. Rather than using fixed temporal windows, the segmentation adapts to the content's inherent structure-action sequences might use shorter 3-5 frame kernels to capture rapid motion, while dialogue scenes might employ longer 7-10 frame kernels that encompass complete conversational exchanges. The segmentation algorithm detects scene transitions through multiple cues including visual discontinuities, audio changes, and motion patterns. Each temporal kernel captures not just the central frame but also contextual frames that provide motion information and temporal continuity. For example, a kernel centered on a dramatic reveal moment would include frames leading up to and following the reveal, ensuring smooth navigation through the narrative timeline.

In a step 1110, dense latent representations are generated for multiple zoom levels and viewing angles per scene. This generation process creates a rich set of latent patches that enable viewers to explore each scene from various perspectives and scales. For each temporal kernel, the encoding process generates latent patches at multiple zoom levels—from wide establishing shots that capture entire environments to extreme close-ups that reveal fine details of actors' expressions or important objects. Additionally, where the source material permits, multiple viewing angles are encoded, such as alternate camera positions or synthesized viewpoints derived from the original footage. The density of representation varies based on scene importance and visual complexity-pivotal dramatic moments receive more comprehensive encoding with finer zoom gradations and more viewing options, while transitional scenes might have sparser representation. This multi-scale, multi-angle encoding creates a navigable space around each scene moment, transforming linear film into an explorable experience.

In a step 1120, a navigable latent map is constructed with smooth transitions between shots. This construction process establishes connections and pathways between the discrete latent representations, creating a continuous navigable space from what was originally edited as separate shots. The map identifies relationships between scenes-such as spatial continuity when cutting between different angles of the same location, or temporal continuity when following a character across scenes. Transition regions are carefully crafted to maintain visual coherence during navigation, potentially synthesizing intermediate viewpoints that bridge discontinuous cuts. For instance, when the original film cuts from a wide shot to a close-up, the latent map might include synthesized intermediate zoom levels that allow viewers to smoothly zoom in rather than experiencing an abrupt cut. The map also preserves the filmmaker's intended pacing and emotional flow while adding navigational freedom, ensuring that free exploration doesn't disrupt narrative coherence.

In a step 1130, base latent patches corresponding to the initial field of view are transmitted. This transmission prioritizes the patches necessary to begin playback at the default viewing configuration, typically matching the original theatrical framing and pacing. The initial transmission includes patches for the opening scenes at standard zoom levels, with additional patches for likely early navigation paths based on typical viewer behavior. Bandwidth allocation ensures that initial playback can begin quickly while background transmission continues for patches that might be needed as the film progresses. The transmission strategy adapts to available bandwidth—on high-speed connections, predictive transmission might include multiple zoom levels and viewing angles for upcoming scenes, while bandwidth-constrained connections receive only essential patches for linear playback with on-demand transmission for exploration features.

In a step 1140, viewer interactions are interpreted for zoom, pan, or perspective changes. This interpretation translates various input methods-touch gestures, mouse movements, game controller inputs, or even eye tracking in VR systems—into navigation commands within the cinematic hyperspace. A pinch gesture might indicate a desire to zoom into a particular character or object, while a swipe could request panning across a scene or jumping to an alternate viewing angle. The interpretation layer includes intelligence to distinguish between intentional navigation and accidental inputs, implementing dead zones and gesture confirmation to prevent unintended departures from the narrative flow. Context-aware interpretation adjusts sensitivity based on the current scene—allowing finer control during slow dramatic moments while providing more stabilized navigation during action sequences. The interpreter also supports preset navigation modes, such as "follow character" modes that automatically track a specific actor through scenes, or "detail exploration" modes that highlight interactive elements within each shot.

In a step 1150, geodesic traversal paths through the latent hyperspace are calculated. These calculations determine optimal routes for transitioning from the current viewing state to the desired target state based on viewer interactions. The path planning considers multiple factors including visual continuity, available latent patches, and narrative coherence. For example, when a viewer requests to zoom into a background element during a dialogue scene, the traversal path might maintain focus on the speakers until a natural pause, then smoothly transition to explore the requested detail. The geodesic paths follow the learned metric structure of the latent space, ensuring that transitions feel natural and maintain visual quality. Complex navigation requests—such as simultaneously changing viewpoint while zooming and advancing through time—are decomposed into smooth multi-stage trajectories that avoid jarring transitions or passes through sparsely represented regions.

In a step 1160, intermediate views are synthesized using generative fill-in when patches are unavailable. This synthesis becomes necessary when viewers explore beyond the pre-encoded representations, such as requesting zoom levels between those explicitly encoded or seeking viewing angles not captured in the original cinematography. The generative process analyzes surrounding available patches to understand scene content, lighting conditions, and visual style, then synthesizes plausible intermediate representations. For instance, when zooming beyond the maximum encoded resolution on an actor's face, the synthesis might generate appropriate skin texture and facial details consistent with the available lower-resolution information and the film's visual aesthetic. The synthesis process maintains awareness of cinematographic style-preserving film grain, color grading, and artistic choices while generating new viewpoints. Quality monitoring ensures that synthesized content meets visual standards, with fallback options to gracefully limit navigation rather than displaying low-quality generated content.

In a step 1170, reconstructed video is rendered with real-time blending between latent patches. This rendering process combines the decoded outputs from multiple latent patches to create seamless visual presentation during navigation. The blending algorithm handles various challenging scenarios-merging patches from different zoom levels during zoom transitions, combining multiple viewing angles during perspective shifts, and maintaining temporal continuity when navigating through time. Advanced edge-aware blending prevents visible seams at patch boundaries while preserving important visual features. The renderer adapts to display capabilities and viewing conditions, potentially enhancing contrast for mobile viewing or adjusting color spaces for different display technologies. During rapid navigation, the renderer might temporarily reduce quality to maintain smooth frame rates, then progressively refine the image once navigation stabilizes. Special attention is paid to preserving cinematographic intent-maintaining the director's chosen depth of field, color grading, and visual effects even as viewers explore alternative perspectives within each scene.

Figure 12:
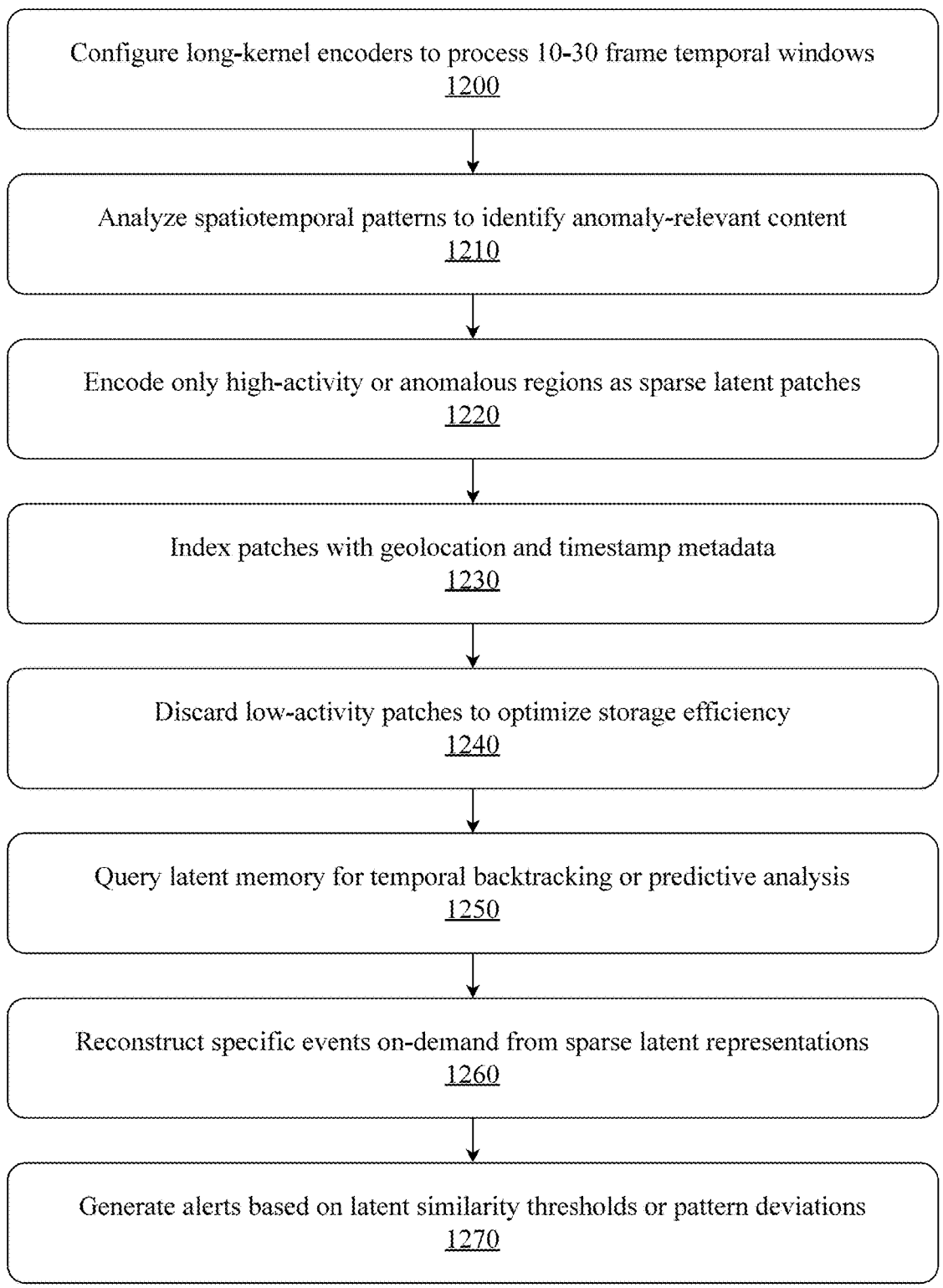
FIG. 12 is a flow diagram illustrating an exemplary method for implementing surveillance and anomaly detection through sparse latent encoding and intelligent pattern analysis.

FIG. 12 is a flow diagram illustrating an exemplary method for implementing surveillance and anomaly detection through sparse latent encoding and intelligent pattern analysis. In a first step 1200, long-kernel encoders are configured to process frame temporal windows. This configuration extends the temporal receptive field far beyond typical video encoding approaches, enabling the capture of extended motion patterns and behavioral sequences. The long temporal kernels allow the encoder to understand activities that unfold over several seconds rather than just instantaneous changes. For example, a 20-frame kernel at 30 fps captures approximately 0.67 seconds of activity, sufficient to encode complete actions like a person entering a restricted area, removing an object, or exhibiting suspicious behavior patterns. The encoder architecture adapts to process these extended temporal windows through specialized temporal convolution layers or attention mechanisms that can maintain long-range dependencies without excessive memory consumption. Different kernel lengths can be selected based on the surveillance context-shorter kernels for high-traffic areas where quick reactions are needed, longer kernels for monitoring slow-developing situations like crowd formation or equipment degradation.

In a step 1210, spatiotemporal patterns are analyzed to identify anomaly-relevant content. This analysis goes beyond simple motion detection to understand the semantic meaning of activities within the surveillance feed. The analysis process employs multiple detection strategies including motion magnitude thresholds, trajectory analysis, object persistence detection, and behavioral pattern matching. For instance, the analyzer might identify anomalies such as objects appearing or disappearing in unexpected ways, people moving against typical traffic flow, or vehicles stopping in no-parking zones. Machine learning models trained on normal activity patterns for specific locations help identify deviations-what constitutes an anomaly in a busy airport differs significantly from anomalies in a secure facility perimeter. The spatiotemporal analysis also considers contextual factors like time of day, with different anomaly thresholds for business hours versus after-hours monitoring.

In a step 1220, only high-activity or anomalous regions are encoded as sparse latent patches. This selective encoding dramatically reduces storage and bandwidth requirements by focusing resources on potentially important events while ignoring static or predictable content. The encoding process creates latent patches only for spatial regions and temporal segments where the anomaly detection indicates significant activity. For example, in a largely static scene with a single person walking through, only the spatiotemporal volume containing the person's movement would be encoded, not the unchanging background. The sparse encoding strategy can achieve substantial compression ratios compared to traditional continuous recording, while preserving all security-relevant information. The encoding threshold adapts dynamically-lowering to capture more detail when anomaly scores are elevated, raising during quiet periods to maximize efficiency.

In a step 1230, patches are indexed with geolocation and timestamp metadata. Each encoded latent patch receives precise spatial and temporal coordinates that enable rapid retrieval and correlation across multiple camera feeds. Geolocation metadata might include not just camera position but also the real-world coordinates of detected activities, enabling queries like "show all activities near the loading dock between 2 AM and 4 AM." Timestamp metadata includes both wall-clock time and relative timing information that helps reconstruct sequences of events across multiple cameras. Additional metadata captures environmental context such as lighting conditions, weather states, or operational status that might affect anomaly interpretation. The indexing system supports complex queries combining spatial, temporal, and activity-based criteria, enabling investigators to quickly locate relevant footage from massive surveillance archives.

In a step 1240, low-activity patches are discarded to optimize storage efficiency. This pruning process continuously evaluates stored patches against retention policies and activity thresholds, removing data that no longer serves security purposes. The discard decisions consider multiple factors including the age of the footage, the anomaly scores of nearby temporal segments, and regulatory requirements for data retention. For instance, patches showing empty corridors might be retained for only 24 hours, while patches containing detected anomalies might be preserved for months or years. The system implements intelligent degradation strategies-rather than complete deletion, older low-priority patches might be re-encoded at lower quality or temporal resolution. This storage optimization enables surveillance systems to maintain months or years of anomaly-focused footage in the same storage space that traditional systems would fill in days.

In a step 1250, latent memory is queried for temporal backtracking or predictive analysis. This querying capability enables both forensic investigation of past events and predictive analytics for preventing future incidents. Temporal backtracking allows investigators to trace the history of detected anomalies—for example, tracking where a suspicious package originated by querying progressively earlier timestamps across multiple camera views. Predictive analysis uses patterns in historical latent representations to identify developing situations, such as detecting crowd formation patterns that historically precede incidents. The query system operates directly on latent representations, enabling rapid pattern matching without full video decoding. Complex queries can combine multiple criteria: "Find all instances similar to this latent pattern within 50 meters of entrances during the past month." The latent-space querying is orders of magnitude faster than traditional video analysis, enabling real-time pattern matching across extensive archives.

In a step 1260, specific events are reconstructed on-demand from sparse latent representations. When investigators need to review detected anomalies or trace complex event sequences, the sparse latent patches are decoded back into viewable video segments. The reconstruction process intelligently handles the sparse nature of the encoded data—gaps between patches can be filled with static frames, interpolated content, or clear indicators of missing data depending on the use case. For multi-camera scenarios, the reconstruction can create synchronized playback across multiple viewpoints, aligning the sparse patches from different cameras to show coordinated views of events. The on-demand reconstruction includes enhancement capabilities, potentially applying super-resolution or noise reduction specifically to important regions identified during investigation. Reconstruction can also generate novel visualizations, such as heat maps of activity patterns or trajectory overlays that help investigators understand complex scenarios.

In a step 1270, alerts are generated based on latent similarity thresholds or pattern deviations. The alert system operates in real-time on the latent representations, comparing incoming encoded patches against databases of known threat patterns or anomaly thresholds. Latent similarity matching can identify situations resembling previous security incidents without requiring exact matches—for example, detecting behavior patterns similar to known shoplifting techniques even with different individuals or locations. Pattern deviation alerts trigger when activities diverge significantly from established baselines, such as unusual congregation patterns or atypical object movements. The alert system implements intelligent filtering to reduce false positives, considering contextual factors and requiring sustained anomalies rather than momentary deviations. Alert priorities adapt based on threat levels and operational requirements—a deviation that might generate a low-priority log entry during normal operations could trigger immediate alerts during high-security periods. The system can also correlate patterns across multiple cameras and time periods, detecting complex scenarios like coordinated activities that might not appear anomalous when viewed in isolation.

Figure 13:
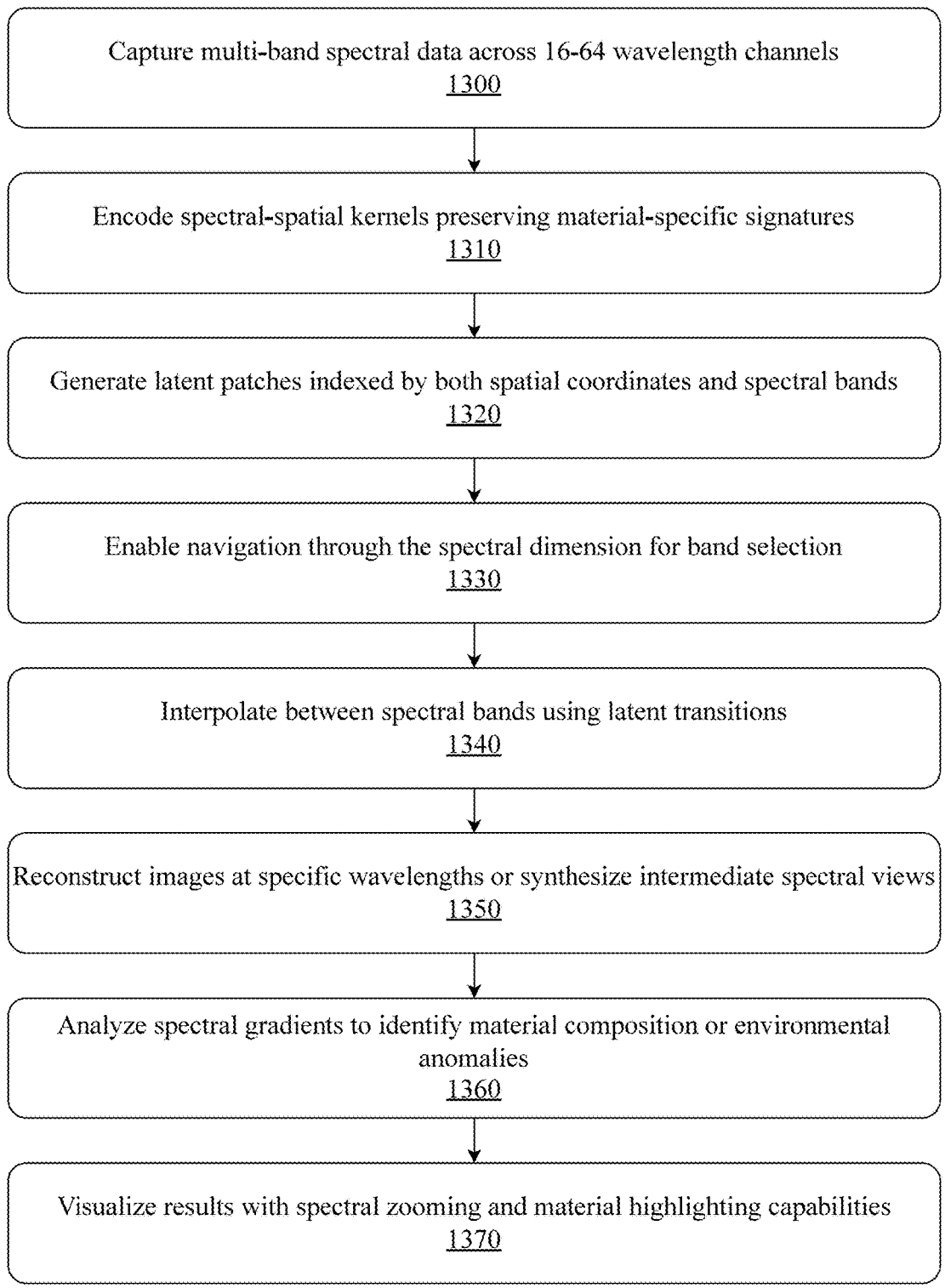
FIG. 13 is a flow diagram illustrating an exemplary method for analyzing and exploring hyperspectral data through latent hyperspace navigation with spectral dimension traversal.

FIG. 13 is a flow diagram illustrating an exemplary method for analyzing and exploring hyperspectral data through latent hyperspace navigation with spectral dimension traversal. In a first step 1300, multi-band spectral data is captured across 16-64 wavelength channels. This capture process employs hyperspectral imaging sensors that record electromagnetic radiation across a broad spectrum, typically spanning from ultraviolet through visible light to near-infrared and thermal infrared regions. Each wavelength channel captures unique information about material properties and environmental conditions—vegetation reflects strongly in near-infrared while absorbing in red wavelengths, water exhibits characteristic absorption patterns, and different minerals show distinctive spectral signatures. The capture system might utilize pushbroom scanners for aerial surveys, snapshot hyperspectral cameras for real-time monitoring, or scanning spectrometers for detailed analysis. For example, an agricultural monitoring system might capture 48 bands spanning 400-2500 nanometers, with higher spectral resolution in key regions like the red edge (680-750 nm) that indicates plant health. The multi-band capture creates a hyperspectral datacube where each spatial pixel contains a complete spectral signature rather than just RGB values.

In a step 1310, spectral-spatial kernels are encoded preserving material-specific signatures. The encoding process treats spectral information as a fundamental dimension rather than simply additional channels, using specialized neural architectures that understand spectral continuity and material physics. The encoder analyzes spectral-spatial neighborhoods—for instance, a 32×32 spatial region with all 64 spectral bands—to capture both the spectral signatures of materials and their spatial distribution patterns. Critical spectral features are preserved during encoding, such as absorption bands that indicate specific chemical compounds, spectral slopes that characterize material types, and spectral indices like NDVI (Normalized Difference Vegetation Index) that have domain-specific meaning. The encoding process might apply spectral unmixing techniques to identify pure material endmembers and their spatial mixing proportions. For geological surveys, the encoder would preserve subtle spectral features that distinguish between similar minerals, while for environmental monitoring, it might emphasize spectral changes that indicate pollution or ecosystem stress.

In a step 1320, latent patches indexed by both spatial coordinates and spectral bands are generated. This dual indexing scheme treats wavelength as a navigable dimension equivalent to spatial position, creating a true spectral-spatial hyperspace. Each latent patch is tagged with its spatial location (x, y) and the spectral range ($\lambda\_min$ to $\lambda\_max$) it represents, enabling efficient retrieval based on either spatial queries ("show all data for this geographic region") or spectral queries ("show the 1450 nm water absorption band across the entire area"). The indexing system might create overlapping patches in the spectral dimension to enable smooth spectral navigation—for example, one patch covering 400-600 nm, another covering 550-750 nm, providing redundancy at spectral boundaries. The multi-dimensional indexing supports complex queries that combine spatial and spectral criteria, such as "find all locations where the spectral signature matches known contaminant patterns."

In a step 1330, navigation through the spectral dimension for band selection is enabled. This navigation capability allows users to smoothly traverse wavelengths just as they would pan across spatial dimensions or zoom in scale. Users can slide through the electromagnetic spectrum, watching how the same scene appears at different wavelengths-vegetation that appears green in visible light suddenly brightening in near-infrared, or hidden moisture patterns becoming visible in specific water absorption bands. The spectral navigation interface might provide preset jumps to scientifically significant wavelengths or spectral indices, such as quickly switching between bands optimized for vegetation analysis, water quality assessment, or mineral identification. The navigation system maintains spatial context while moving through spectral space, allowing users to track how specific features or materials change their appearance across wavelengths. For example, an environmental scientist could lock onto a specific geographic coordinate and smoothly navigate through wavelengths to understand the complete spectral signature of suspected contamination.

In a step 1340, interpolation between spectral bands using latent transitions is performed. This interpolation enables smooth spectral navigation even when viewing wavelengths between the originally captured bands. The latent transition functions understand spectral physics knowing that spectral signatures typically vary smoothly except at specific absorption or emission features. When a user requests to view 725 nm but only 700 nm and 750 nm were captured, the interpolation synthesizes a physically plausible intermediate representation. The interpolation process is more sophisticated than simple linear blending, using learned models of spectral behavior for different material types. For atmospheric monitoring, the interpolation might model how atmospheric absorption affects different wavelengths, while for mineralogy, it might preserve sharp absorption features that indicate specific crystal structures. The spectral interpolation can also extrapolate slightly beyond captured ranges when physical models provide reliable predictions, though with appropriate uncertainty indicators.

In a step 1350, images at specific wavelengths are reconstructed or intermediate spectral views are synthesized. The reconstruction process transforms latent representations back into viewable images at requested wavelengths, handling both captured bands and synthesized intermediate wavelengths. When reconstructing captured wavelengths, the decoder produces full spatial resolution images that preserve fine spectral details. For synthesized wavelengths, the reconstruction combines information from nearby bands with spectral interpolation to create plausible views. The reconstruction can generate various visualization products beyond simple grayscale images-false color composites that map specific band combinations to RGB displays, spectral index images that highlight particular phenomena, or difference images that show changes between wavelengths. For precision agriculture, the system might reconstruct NDVI maps that clearly show crop health variations, while for geological exploration, it might generate mineral index images that highlight ore deposits.

In a step 1360, spectral gradients are analyzed to identify material composition or environmental anomalies. This analysis operates on the spectral signatures extracted from the latent representations, identifying characteristic patterns that indicate specific materials or conditions. Spectral gradient analysis can detect subtle features like the red edge position that indicates vegetation stress, specific absorption features that identify minerals or chemicals, or broadband albedo changes that suggest environmental changes. The analysis employs spectral libraries that catalog known material signatures, enabling automated identification through spectral matching algorithms. Anomaly detection identifies spectral signatures that deviate from expected patterns for a given environment-unusual spectral features might indicate contamination, invasive species, or geological anomalies. For water quality monitoring, the analysis might detect algae blooms through their characteristic chlorophyll absorption features, while for mining exploration, it might identify subtle spectral anomalies indicating subsurface mineralization.

In a step 1370, results are visualized with spectral zooming and material highlighting capabilities. The visualization system presents hyperspectral analysis results in intuitive, interactive formats that support both exploration and decision-making. Spectral zooming allows users to expand specific wavelength ranges for detailed examination—zooming into the 2000-2500 nm region to analyze mineral absorption features or the 680-750 nm red edge for vegetation analysis. Material highlighting uses spectral classification results to create overlay visualizations where identified materials are color-coded or highlighted—vegetation in green, water in blue, specific minerals in distinctive colors. The visualization can display spectral signatures as graphs for selected pixels, showing how reflectance varies across wavelengths with identified absorption features annotated. Advanced visualizations might include 3D spectral-spatial displays where users can navigate through a cube of data with wavelength as the third dimension, or animated sequences that show how scenes change appearance when moving through the spectrum. Interactive tools allow users to define custom spectral indices or band combinations optimized for their specific analysis needs, with real-time visualization updates as parameters are adjusted.

Figure 14:
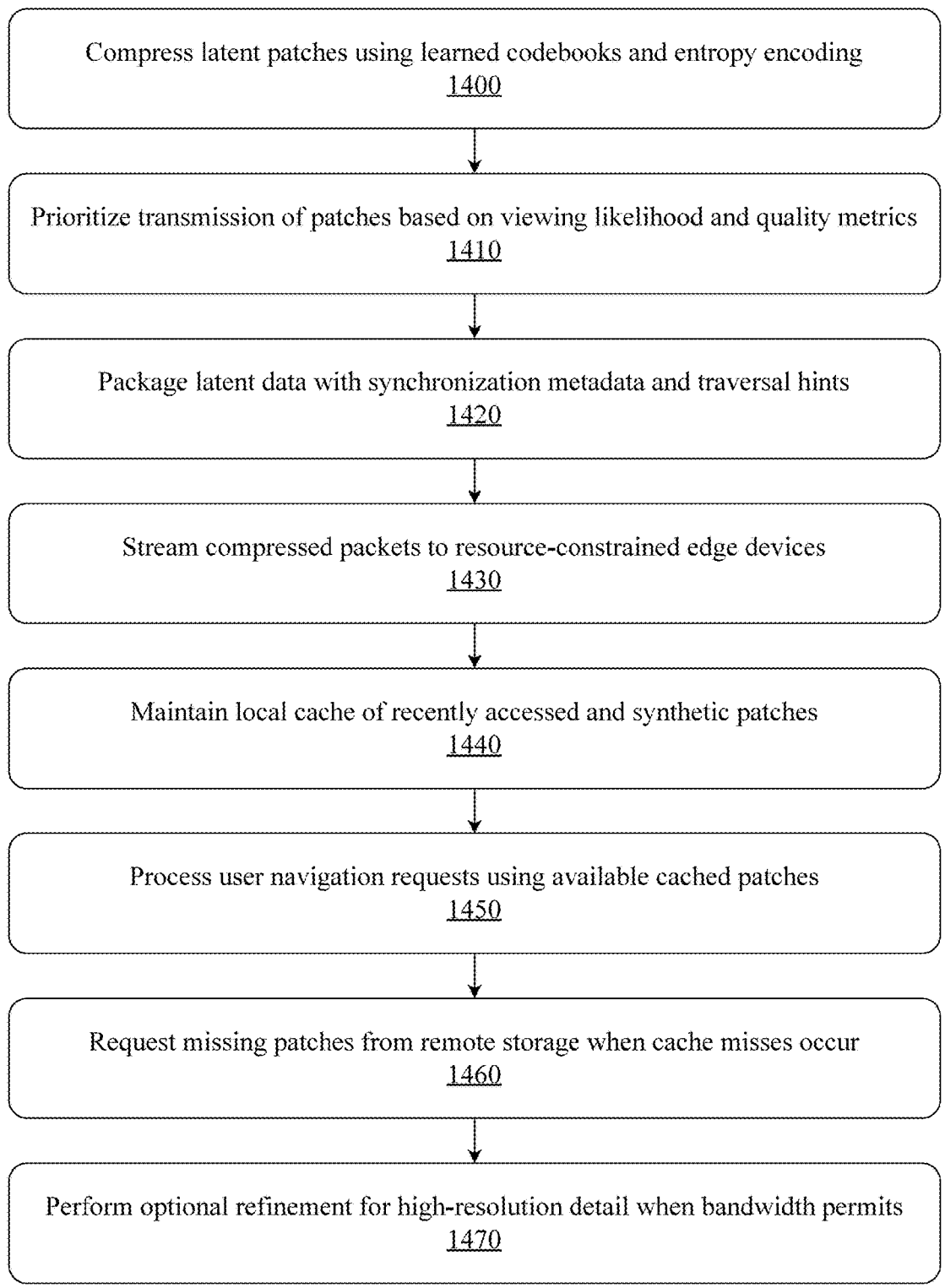
FIG. 14 is a flow diagram illustrating an exemplary method for streaming and deploying latent hyperspace content to resource-constrained edge devices with adaptive quality management.

FIG. 14 is a flow diagram illustrating an exemplary method for streaming and deploying latent hyperspace content to resource-constrained edge devices with adaptive quality management. In a first step 1400, latent patches are compressed using learned codebooks and entropy encoding. This compression builds upon the already compact latent representations to achieve additional bandwidth savings crucial for streaming scenarios. Learned codebooks contain frequently occurring patterns discovered through analysis of large corpora of latent patches—common edge structures, texture elements, or temporal transition patterns that appear across diverse content. Rather than transmitting full latent arrays, patches can reference codebook entries with small indices, achieving significant compression when patterns match. The entropy encoding stage applies information-theoretic compression tailored to the statistical properties of latent representations, using adaptive arithmetic coding or asymmetric numeral systems that model the probability distributions of latent values. For example, a 16×16×32 latent array requiring 8 KB uncompressed might compress to 1-2 KB through combined codebook substitution and entropy coding. Different codebooks can be employed for different content types—action scenes might use motion-optimized codebooks while static scenes employ texture-focused variants.

In a step 1410, transmission of patches is prioritized based on viewing likelihood and quality metrics. This prioritization ensures that limited bandwidth is allocated to deliver the most valuable content first. Viewing likelihood is calculated through multiple factors including current user position in the hyperspace, navigation velocity and direction, historical navigation patterns, and predictive models of user behavior. Quality metrics consider both the perceptual importance of patches (those containing faces, text, or motion typically receive higher priority) and their reconstruction quality scores. The prioritization creates multiple transmission tiers—critical patches for current viewing are transmitted immediately, likely near-future patches follow, speculative prefetch patches use remaining bandwidth, and low-probability patches await explicit requests. For live streaming scenarios, temporal prioritization ensures smooth playback by transmitting patches in presentation order, while interactive exploration might prioritize spatial neighborhoods around the current position.

In a step 1420, latent data is packaged with synchronization metadata and traversal hints. Each transmission packet contains not just compressed latent data but essential contextual information for proper reconstruction and navigation. Synchronization metadata includes precise timestamps for temporal alignment, coordinate system references for spatial positioning, and sequence numbers for packet ordering and loss detection. Traversal hints provide navigation assistance by indicating neighboring patch availability, suggested navigation paths based on content structure, and warnings about sparse regions requiring synthesis. The packaging might bundle multiple small patches into single network packets for efficiency or split large patches across multiple packets with redundancy coding for resilience. For example, a packet might contain a primary latent patch, metadata indicating that high-quality neighboring patches exist to the north and east, and hints that zooming in beyond 2× will require synthesis.

In a step 1430, compressed packets are streamed to resource-constrained edge devices. The streaming process adapts to diverse network conditions and device capabilities, implementing multiple strategies for reliable delivery. Adaptive bitrate streaming adjusts quality levels based on measured bandwidth—degrading gracefully during network congestion while maximizing quality when conditions improve. The streaming protocol might implement HTTP adaptive streaming for compatibility, custom UDP protocols for low latency, or peer-to-peer distribution for scalability. Buffer management on edge devices balances latency against playback smoothness, maintaining enough content for continuous viewing while minimizing delay. For mobile devices, streaming considers battery consumption, potentially reducing transmission frequency during low-battery states. Network-aware transmission might bundle transfers during strong connectivity or preload content when on WiFi for later mobile viewing.

In a step 1440, a local cache of recently accessed and synthetic patches is maintained. This cache operates within memory constraints of edge devices—perhaps only 100-500 MB on a set-top box or 50-200 MB on mobile devices. The caching strategy must therefore be highly selective, keeping patches based on complex prioritization that considers access recency, likelihood of reuse, reconstruction cost, and relationship to current navigation. Synthetic patches generated through local computation are cached to avoid expensive regeneration, tagged with their generation parameters and quality scores. The cache implements eviction policies-spatial patches near the current position might be retained longer than temporal patches from past timestamps, while synthetic patches might be evicted before original content. Cache organization optimizes for access patterns, potentially using spatial data structures that enable quick retrieval of patches within view frustums.

In a step 1450, user navigation requests are processed using available cached patches. When users interact through zooming, panning, or temporal navigation, the request processor first attempts to satisfy requests entirely from cached content. This local processing enables responsive interaction even during network interruptions or high latency conditions. The processor evaluates cache coverage for the requested view, potentially adjusting navigation to available content—for instance, limiting zoom range to cached levels or suggesting alternative viewing angles with better cache coverage. Complex navigation requests might be decomposed into movements through cached regions, plotting paths that maximize the use of available patches while minimizing quality degradation. For smooth user experience, the processor might display lower-quality cached versions immediately while fetching higher-quality replacements in the background.

In a step 1460, missing patches are requested from remote storage when cache misses occur. The request system implements intelligent strategies to minimize latency and bandwidth usage while maintaining visual quality. Requests are batched and prioritized-patches directly in the view frustum receive highest priority, followed by patches along predicted navigation paths. The request protocol might implement range requests for partial patch data, predictive prefetching based on navigation patterns, and request coalescing to avoid redundant transfers. For unreliable networks, the system might request multiple quality levels of critical patches, using lower quality versions if high quality transfers fail. Request pacing prevents overwhelming the network or server infrastructure, spreading non-critical requests over time. The system also tracks request failures and implements exponential backoff for problematic patches rather than repeatedly failing.

In a step 1470, optional refinement for high-resolution detail is performed when bandwidth permits. This refinement enhances visual quality beyond base requirements when network conditions are favorable. Refinement might involve receiving enhancement layers that add detail to base quality patches, fetching higher resolution versions of previously transmitted patches, or obtaining additional spectral bands or viewing angles. The refinement process operates opportunistically-monitoring available bandwidth and upgrading quality during idle periods. For example, while a user examines a particular scene, the system might progressively download higher quality versions of that content and speculative high-quality patches for likely navigation targets. Local refinement might also occur through super-resolution neural networks that enhance patch quality using device-side computation when bandwidth is more constrained than processing power. The refinement system maintains awareness of device capabilities, avoiding refinements that would exceed display resolution or processing capacity.

Figure 15:
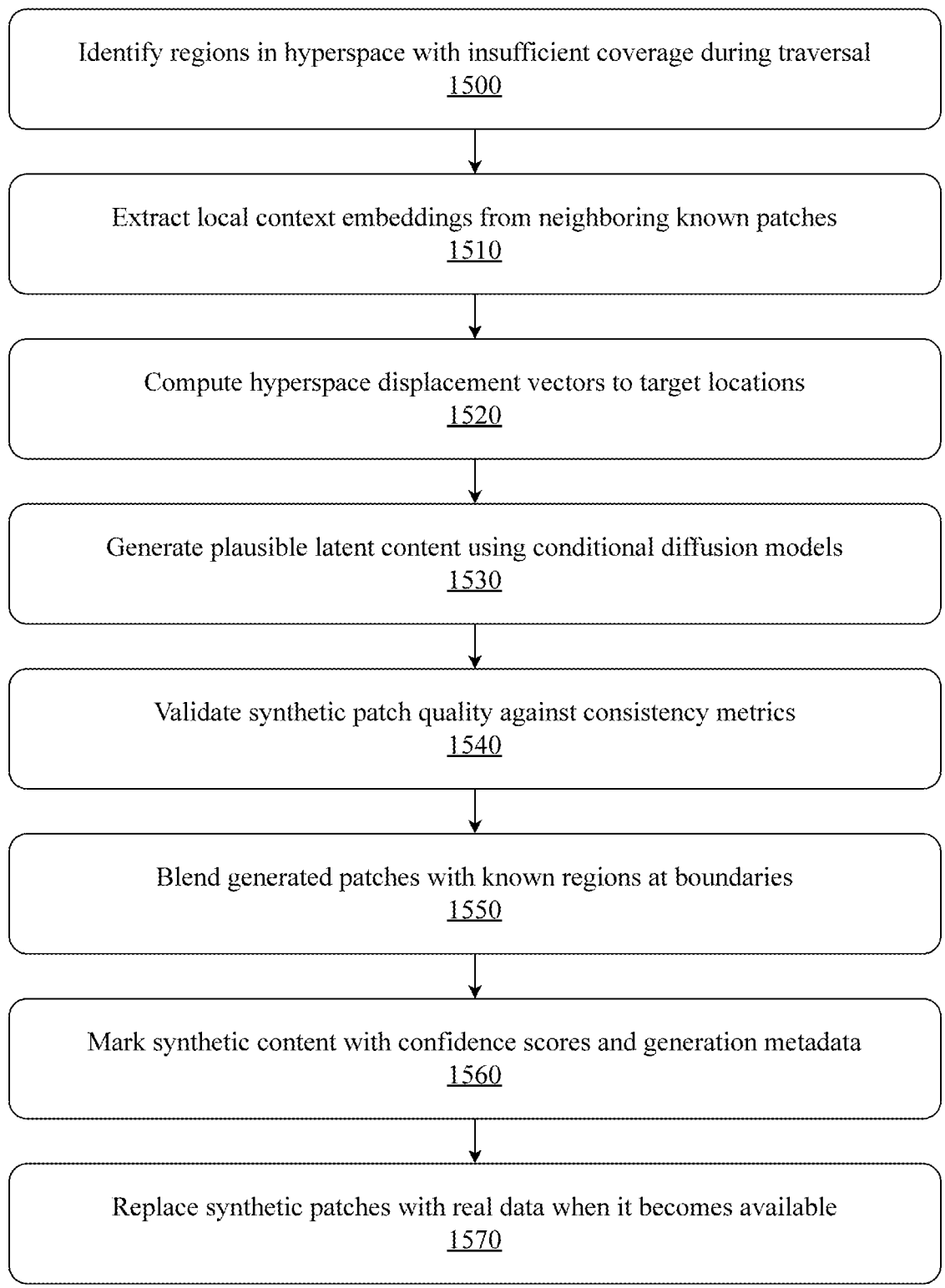
FIG. 15 is a flow diagram illustrating an exemplary method for generating synthetic content to fill sparse regions of the hyperspace during navigation, ensuring continuous exploration beyond recorded boundaries.

FIG. 15 is a flow diagram illustrating an exemplary method for generating synthetic content to fill sparse regions of the hyperspace during navigation, ensuring continuous exploration beyond recorded boundaries. In a first step 1500, regions in hyperspace with insufficient coverage are identified during traversal. This identification occurs continuously as users navigate through the multidimensional space, with coverage analysis performed along current positions and predicted trajectories. The detection algorithm queries the hyperspace memory for available patches within threshold distances, considering the learned metric tensor that defines meaningful proximities in the latent space. Insufficient coverage might manifest in various ways—temporal gaps between sparsely sampled frames, spatial regions beyond the boundaries of captured content, zoom levels exceeding the maximum encoded resolution, or viewing angles not present in the original capture. For example, when a user attempts to zoom into microscopic detail on a surface texture, the detection system recognizes when no patches exist at the requested scale. The identification process also considers coverage quality, flagging regions where only low-confidence or degraded patches are available as candidates for regeneration.

In a step 1510, local context embeddings are extracted from neighboring known patches. This extraction process gathers semantic and structural information from the surrounding hyperspace region to guide synthesis. The context extraction analyzes multiple aspects of nearby patches including visual content (dominant colors, textures, objects), motion patterns (optical flow, trajectory information), lighting conditions (illumination direction, shadows, atmospheric effects), and stylistic properties (grain, compression artifacts, artistic treatments). The extraction process weights contributions from different neighbors based on their geodesic distance and relevance to the target location. For instance, when generating a patch between two temporal moments, the context heavily weights the immediately preceding and following frames while also considering spatial neighbors that might indicate environmental constraints. The extracted context is encoded into a compact embedding vector that captures the essential characteristics needed for consistent synthesis.

In a step 1520, hyperspace displacement vectors to target locations are computed. These vectors precisely specify where in the multidimensional space the synthetic patches need to be generated relative to known content. The displacement calculation uses the hyperspace coordinate system to determine not just spatial offsets but complete multidimensional relationships including temporal deltas, scale differences, angular rotations, and spectral shifts. For complex navigation scenarios, multiple displacement vectors might be computed to represent paths from different reference patches to the target location. The vectors encode both magnitude and direction in each dimension—for example, a displacement might indicate "+2.5 units in x, +1.2 units in time, +0.8 in zoom level." These precise displacements ensure that generated content appears at exactly the right position to fill coverage gaps and enable smooth navigation.

In a step 1530, plausible latent content is generated using conditional diffusion models. The generation process takes the context embeddings and displacement vectors as conditioning inputs to synthesize new latent patches that maintain consistency with surrounding content. The conditional diffusion model operates through an iterative denoising process, starting from random noise and progressively refining it into structured latent representations. At each denoising step, the model considers the local context to ensure generated features align with neighboring content—maintaining consistent lighting, preserving object boundaries, and continuing motion trajectories. For example, when generating intermediate frames in a fast action sequence, the model learns to interpolate motion blur and maintain dynamic consistency. The diffusion process can be guided by additional constraints such as physical plausibility (objects don't suddenly appear or disappear) or stylistic consistency (maintaining film grain or artistic effects). The model architecture is specifically designed for latent space generation, operating on the same Lorentzian manifold structure used throughout the system.

In a step 1540, synthetic patch quality is validated against consistency metrics. This validation ensures that generated content meets quality standards before integration into the navigation pipeline. Multiple validation criteria are applied including reconstruction quality (how well the synthetic patch decodes to visually plausible content), local consistency (whether the patch maintains appropriate relationships with its neighbors), global coherence (absence of artifacts or impossible features), and confidence scoring (the model's certainty in its generation). The validation process might decode the synthetic patch and analyze the reconstructed content for artifacts like unnatural boundaries, inconsistent lighting, or implausible motion. Statistical measures compare the synthetic patch's latent distribution against expected ranges derived from real patches in similar contexts. If validation fails, the generation process might be retried with adjusted parameters or different conditioning, or the system might limit navigation to prevent displaying low-quality synthetic content.

In a step 1550, generated patches are blended with known regions at boundaries. This blending process ensures seamless visual transitions between synthetic and real content, preventing visible discontinuities that would break immersion. The blending operates in the latent space, using the metric tensor to determine appropriate weighting functions that respect the geometric structure of the hyperspace. Boundary regions are identified where synthetic patches adjoin real ones, and smooth transition functions are applied that gradually shift from one to the other. For example, when a synthetic patch fills a temporal gap, the blending might heavily weight the real patches at the boundary frames while smoothly transitioning to full synthetic content in the middle. The blending process also considers perceptual factors-edges and important features might use sharper transitions while smooth regions employ gradual blending. Multi-resolution blending might be applied, with different blending strategies for different frequency components of the latent representation.

In a step 1560, synthetic content is marked with confidence scores and generation metadata. This marking ensures system components and users can distinguish between original and generated content. Confidence scores reflect multiple factors including the quality of context information used, the certainty of the diffusion model during generation, the validation results, and the distance from known content. Generation metadata records the complete provenance of synthetic patches including timestamp of generation, reference patches used for context, model version and parameters, and displacement vectors that positioned the patch. This metadata enables intelligent handling throughout the system-rendering pipelines might apply different processing to synthetic content, caching systems might use different retention policies, and user interfaces might provide visual indicators of synthetic regions. For example, a documentary application might subtly indicate when viewers are seeing generated content rather than original footage, maintaining transparency about data authenticity.

In a step 1570, synthetic patches are replaced with real data when it becomes available. This replacement ensures that the system always prefers authentic content over synthetic approximations. The replacement process continuously monitors for new real patches that overlap with synthetic regions—this might occur when additional content is uploaded, when different quality levels become available, or when parallel capture systems provide alternative viewpoints. When replacement candidates are identified, the system evaluates whether they provide better coverage than existing synthetic patches, considering factors like resolution, quality metrics, and completeness. The replacement process handles smooth transitions to prevent jarring visual changes during active viewing—potentially blending between synthetic and real versions over several frames. Cache management ensures that replaced synthetic patches are appropriately purged while maintaining any that still serve coverage needs. The replacement system also updates navigation maps and metadata to reflect the availability of real content, potentially enabling new navigation possibilities that were previously limited by synthetic content constraints.

In an exemplary embodiment, the hyperspace coordinate system described can be extended to incorporate audio, text, and sensor data as additional latent dimensions beyond the visual and spectral axes. Encoder 111 can be configured with additional processing pathways for multimodal content, where audio streams are processed through specialized temporal convolution layers that extract acoustic features such as frequency spectra, speech patterns, and spatial audio cues. These audio features are encoded into the same Lorentzian latent patch structure, maintaining temporal synchronization with visual content through the shared temporal axis (t). For narrative content, text embeddings representing dialogue, captions, or contextual information can be incorporated as additional channels within the latent arrays, enabling synchronized subtitle display or dialogue-aware visual reconstruction during navigation. The hyperspace memory database 113 indexes these multimodal patches using extended coordinate tuples that include modality indicators, allowing queries such as "navigate to scenes with specific dialogue" or "zoom into regions with particular sound signatures." The transition function trainer 114 learns cross-modal relationships, enabling smooth transitions that maintain audio-visual coherence—for instance, ensuring that zooming into a speaking character maintains lip-sync accuracy while adjusting spatial audio perspective appropriately.

In another embodiment, the latent traversal functions and decoding mechanisms described can be embedded directly within mixed-reality headsets to enable frame-by-frame synthesis of 6-degree-of-freedom (6-DoF) navigable scenes within power-constrained envelopes. In this embodiment, edge device 140 architecture is adapted for head-mounted displays where latent decoder network 740 is optimized for stereoscopic rendering with minimal latency. Zoom controller 112 interfaces with head tracking sensors to translate physical head movements into hyperspace navigation commands, mapping rotational movements to the orientation parameters (theta, phi) and translational movements to spatial coordinates (x, y, z). Local patch cache 720 implements predictive caching based on head movement patterns, pre-loading latent patches in the direction of gaze to minimize motion-to-photon latency. For AR applications, the system can blend decoded content with real-world imagery by operating the frame compositor 730 in a transparency-aware mode, where certain regions of reconstructed frames are designated as overlay elements. The generative fill-in module 117 can be triggered by rapid head movements to synthesize intermediate viewpoints that maintain visual continuity during fast rotations, preventing motion sickness and maintaining immersion.

In another embodiment, encoder 111, transition function trainer 114, and generative fill-in module 117 can be partially trained or updated across user devices in a privacy-preserving federated learning configuration. In this embodiment, edge devices 140 contribute to model improvement without transmitting raw user data. Each edge device maintains local training datasets consisting of navigation patterns, reconstruction quality metrics, and user preferences. The training network 430 is modified to support federated updates where edge devices compute gradient updates based on local data and transmit only aggregated model improvements back to the central system. For personalization, the neural transition network 420 can maintain both global and user-specific layers, where global layers benefit from federated learning while user-specific layers adapt to individual navigation preferences. The conditional diffusion model 640 in the generative fill-in module can be fine-tuned based on federated learning of common navigation patterns—for instance, learning that users frequently explore certain types of scene details, prompting pre-generation of those specific synthetic patches. Privacy preservation is ensured through differential privacy mechanisms and secure aggregation protocols that prevent reconstruction of individual user behavior from model updates.

In another embodiment, a structured query mechanism can be implemented using the hyperspace memory database 113 and metadata generator 116 to enable programmatic navigation through natural language or structured queries. In this embodiment, the query interface 350 is extended with a query language parser that translates high-level navigation intents into hyperspace coordinate specifications and traversal commands. Queries such as "zoom in on regions with high thermal contrast at time T1" are parsed to identify relevant dimensions (zeta for zoom, lambda for thermal bands, t for temporal position) and constraints (thermal contrast thresholds). The metadata parser 550 processes these structured queries by first identifying the relevant metadata fields-thermal signatures would map to specific spectral bands in the 8-14 µm range-then the coordinate transformer 510 converts these specifications into precise hyperspace coordinates. Complex queries can combine multiple criteria: "traverse across all security checkpoints between 2 AM and 4 AM showing unusual motion patterns" would trigger the sparse region detector 600 to identify temporal-spatial regions matching the criteria, potentially invoking synthesis for gaps in surveillance coverage. The query language can support both imperative commands ("go to specific coordinates") and declarative goals ("find similar scenes"), with the traversal path calculator 520 determining optimal paths to satisfy the query constraints.

The latent representations produced by encoder 111 and processed by latent compressor 115 can be further compressed using learned codebooks, entropy models, or transformer-based latent tokenizations to form next-generation media transmission protocols. In this embodiment, the learned codebook 820 is extended to implement hierarchical vector quantization where latent patches are decomposed into multi-scale tokens. These tokens represent recurring patterns at different granularities-fine-scale tokens might encode texture primitives while coarse-scale tokens represent scene structures. The entropy encoder 810 implements a transformer-based architecture that predicts token sequences, achieving higher compression by modeling long-range dependencies between tokens. For streaming applications, the packet formatter 850 creates a layered bitstream where base tokens provide coarse reconstruction while enhancement tokens progressively refine quality. This tokenized representation enables new transmission modes such as semantic streaming, where high-level scene descriptions are transmitted first, allowing edge devices to generate approximate content while detailed tokens arrive. The system can adapt token vocabularies for specific content domains-surveillance footage might use motion-centric tokens while medical imaging employs tissue-specific tokens-achieving domain-optimized compression ratios while maintaining application-specific fidelity requirements.

During idle periods or sleep-mode operation, the system components can explore novel latent combinations to pre-generate likely navigational content through self-supervised learning. In this embodiment, the transition function trainer 114 operates in an unsupervised mode where the neural transition network 420 generates speculative navigation paths through the hyperspace by sampling from learned navigation distributions. The geodesic path planner 410 identifies underexplored regions of the hyperspace-areas with sparse coverage but high predicted navigation probability based on historical patterns. During idle processing, the conditional diffusion model 640 generates synthetic patches for these regions without explicit user requests, creating a "dream-like" exploration of potential content. The quality validator 650 evaluates these speculative generations against consistency metrics, retaining only those that maintain coherence with existing content. For example, in a surveillance system during overnight idle periods, the system might pre-generate synthetic patches for predicted morning traffic patterns based on historical data, enabling instant response when operators begin morning shifts. The synthetic patch cache 660 maintains these speculative generations with special metadata indicating their pre-generated nature and confidence levels, allowing the cache manager 360 to prioritize them appropriately during active navigation.

In another embodiment, the latent patch architecture can be extended to produce intermediate 3D reconstructions including meshes, depth maps, or implicit neural fields. In this embodiment, encoder 111 includes additional processing pathways that extract 3D geometric features from multi-view inputs or depth sensors. The spatiotemporal processor 210 is augmented with stereo correspondence modules that identify 3D structure from multiple viewpoints, encoding this information into specialized channels within the Lorentzian latent patches. During decoding, latent decoder network 740 can reconstruct not just color images but also depth maps and surface normal estimates. Frame compositor 730 can operate in a 3D-aware mode where multiple decoded patches from different viewpoints are fused into consistent 3D representations using neural radiance field techniques. For navigation, the coordinate transformer 510 supports 3D spatial queries where users can orbit around reconstructed objects or navigate through reconstructed 3D spaces. Generative fill-in module 117 can synthesize missing 3D structure by learning geometric priors—for instance, completing occluded portions of objects based on visible geometry and learned shape distributions. This enables applications where users can extract 3D models from video content for use in CAD systems, virtual production, or spatial analysis.

For robotic and unmanned aerial vehicle (UAV) applications, the latent hyperspace traversal system can incorporate LiDAR, radar, and inertial measurement unit (IMU) data, merging physical navigation with latent prediction for enhanced decision-making. In this embodiment, input processor 200 is configured to handle heterogeneous sensor streams with different sampling rates and data formats. LiDAR point clouds are encoded through specialized 3D convolution layers that preserve spatial structure while compressing point density. Radar returns are processed to extract velocity and material property information, encoded as additional channels in the spectral dimension (lambda). IMU data provides motion constraints that help resolve ambiguities in visual odometry and improve temporal coherence. Feature fuser 220 implements attention-based sensor fusion that weights different sensor modalities based on environmental conditions—prioritizing LiDAR in clear conditions but relying more on radar in fog or rain. Hyperspace coordinate tracker 900 maintains precise localization by fusing latent-space navigation with physical sensor measurements, enabling robust positioning even when individual sensors fail. For path planning, geodesic path planner 410 incorporates physical constraints from sensor data, ensuring that proposed navigation paths are physically realizable by the robotic platform while optimizing for both latent-space coherence and real-world traversability.

In another embodiment, a generative storytelling layer can interpret user navigation paths through the hyperspace to dynamically curate or synthesize content with coherent thematic structure. In this embodiment, traversal history logger 920 captures not just coordinates visited but semantic interpretations of navigation patterns. These patterns are analyzed by a narrative inference engine that identifies story-like structures in user exploration—for instance, recognizing when a user follows a particular character through multiple scenes or repeatedly examines specific objects. Context analyzer 610 is extended to extract narrative elements such as character positions, emotional cues, and scene transitions. Based on detected narrative interests, the system can automatically generate navigation suggestions that complete story arcs or reveal related content. For example, if a user explores all appearances of a mysterious object in a film, the system might synthesize a montage view that collects these moments in a coherent sequence. Conditional diffusion model 640 can be prompted with narrative constraints to generate synthetic scenes that bridge story gaps—creating "what if" scenarios or alternative perspectives that maintain consistency with the established narrative world. Metadata generator 116 creates story-aware metadata that tags latent patches with narrative significance, enabling queries like "show all turning points" or "navigate to emotional climaxes," transforming passive viewing into active story exploration.

In another embodiment, latent structures generated by encoder 111 and stored in hyperspace memory database 113 can embed invisible authentication signals, access controls, and tamper-evident signatures. In this embodiment, variational autoencoder 240 is trained with an additional watermarking objective that embeds cryptographic signatures into the latent representation without affecting reconstruction quality. These signatures are distributed across the latent array in a pattern determined by a secret key, making them robust to compression and partial patch retrieval. Output formatter 250 adds encrypted metadata containing ownership information, access permissions, and integrity checksums. During traversal, metadata parser 550 verifies these authentication signals, enabling fine-grained access control where certain zoom levels, time ranges, or spectral bands require specific permissions. Quality validator 750 on edge devices includes tamper detection that identifies modified or synthetic patches that lack valid signatures. For forensic applications, the system maintains an immutable audit trail in the hyperspace memory database tracking all access and modifications to latent patches. Generative fill-in module 117 can be configured to propagate watermarks into synthetic content, ensuring that generated patches maintain the same ownership and authenticity properties as original content while clearly marking their synthetic nature through additional embedded signals.

Exemplary Computing Environment

Figure 16:
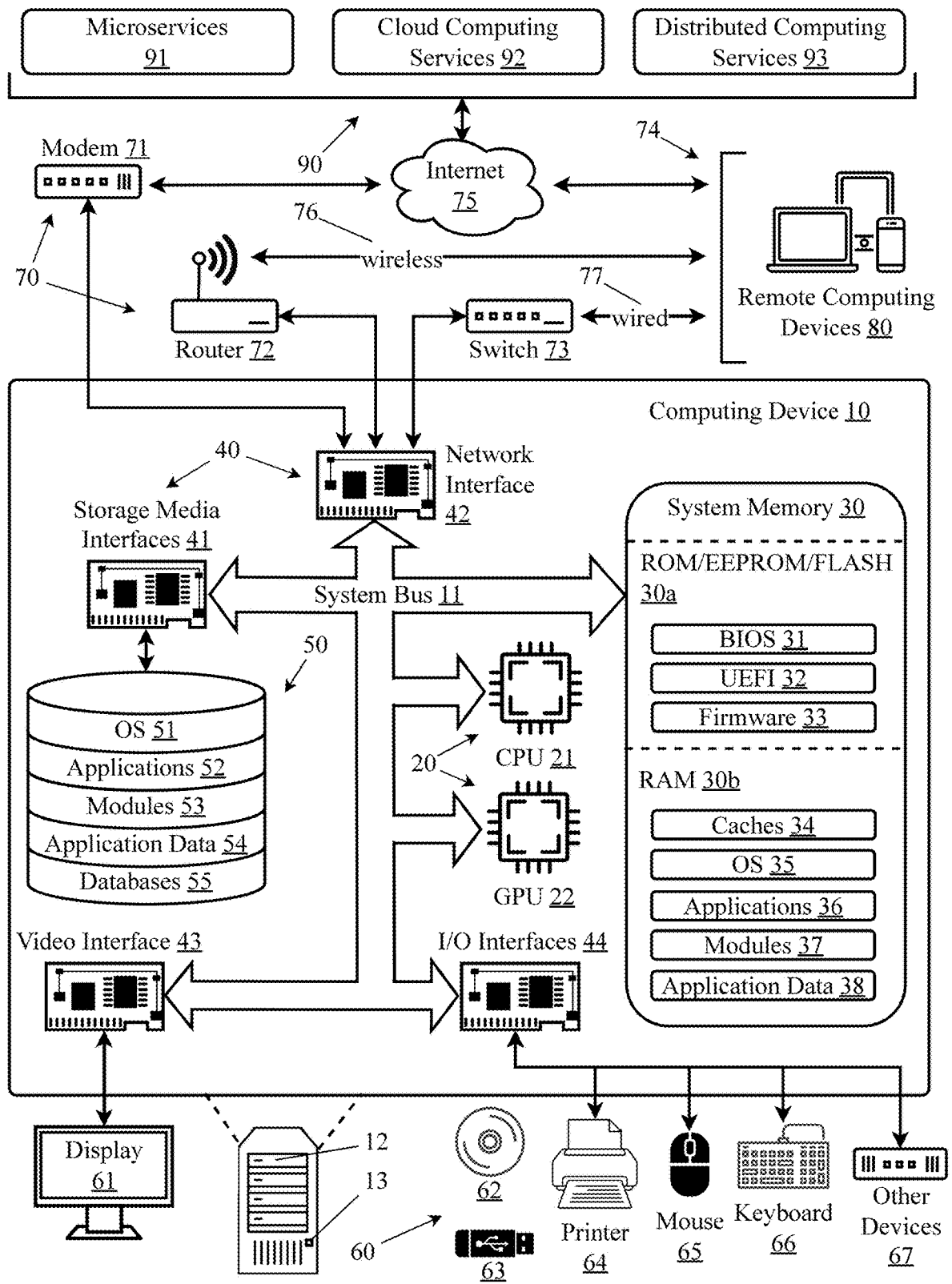
FIG. 16 illustrates an exemplary computing environment on which an embodiment described herein may be implemented, in full or in part.

FIG. 16 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS)

31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising: a hardware memory, wherein the computer system is configured to execute software instructions stored on nontransitory machine-readable storage media that:
   initialize a multi-dimensional hyperspace coordinate system;
   encode a plurality of media data into compact latent representations by processing a plurality of multi-dimensional kernels through a variational autoencoder constrained to produce Lorentzian latent patches;
   organize the latent patches in a navigable hyperspace memory indexed by coordinate tuples that specify position across all dimensional axes;
   enable smooth traversal through the hyperspace by learning a metric tensor that defines geodesic paths between latent patches;
   maintain navigational continuity in sparse regions by synthesizing plausible latent patches through conditional diffusion based on neighboring context; and
   reconstruct visual content at arbitrary hyperspace positions by decoding and blending relevant latent patches according to user navigation commands.

2. The computer system of claim 1, wherein the hyperspace coordinate system spans spatial, temporal, orientation, scale, and spectral axes.

3. The computer system of claim 1, wherein the variational autoencoder processes kernel-sized tensor inputs that capture spatial regions, temporal frames, and spectral bands, and outputs 2D latent arrays that preserve spatial structure.

4. The computer system of claim 1, wherein synthesizing plausible latent patches comprises:
   extracting local context embeddings from neighboring patches;
   computing hyperspace displacement vectors to target locations; and
   iteratively refining noise through a conditional diffusion model to generate latent representations that maintain consistency with surrounding content.

5. A method for multimodal latent hyperspace navigation incorporating spectral, spatial, temporal, and scale dimensions, comprising the steps of:
   initializing a multi-dimensional hyperspace coordinate system;
   encoding a plurality of media data into compact latent representations by processing a plurality of multi-dimensional kernels through a variational autoencoder constrained to produce Lorentzian latent patches;
   organizing the latent patches in a navigable hyperspace memory indexed by coordinate tuples that specify position across all dimensional axes;
   enabling smooth traversal through the hyperspace by learning a metric tensor that defines geodesic paths between latent patches;
   maintaining navigational continuity in sparse regions by synthesizing plausible latent patches through conditional diffusion based on neighboring context; and
   reconstructing visual content at arbitrary hyperspace positions by decoding and blending relevant latent patches according to user navigation commands.

6. The method of claim 5, wherein the hyperspace coordinate system spans spatial, temporal, orientation, scale, and spectral axes.

7. The method of claim 5, wherein the variational autoencoder processes kernel-sized tensor inputs that capture spatial regions, temporal frames, and spectral bands, and outputs 2D latent arrays that preserve spatial structure.

8. The method of claim 5, wherein synthesizing plausible latent patches comprises:
   extracting local context embeddings from neighboring patches;
   computing hyperspace displacement vectors to target locations; and
   iteratively refining noise through a conditional diffusion model to generate latent representations that maintain consistency with surrounding content.

* * * * *